United States Patent [19]

Ikenoue et al.

[11] Patent Number: 5,168,303
[45] Date of Patent: Dec. 1, 1992

[54] PHOTOGRAPHIC PRINTING METHOD

[75] Inventors: Shinpei Ikenoue; Takaaki Terashita, both of Kanagawa, Japan

[73] Assignee: Fuji Photo Film Co., Ltd., Kanagawa, Japan

[21] Appl. No.: 609,547

[22] Filed: Nov. 6, 1990

[30] Foreign Application Priority Data

Nov. 10, 1989 [JP] Japan .................. 1-293649
Nov. 10, 1989 [JP] Japan .................. 1-293650
Nov. 10, 1989 [JP] Japan .................. 1-293651
Nov. 10, 1989 [JP] Japan .................. 1-293652

[51] Int. Cl.⁵ .............................. G03B 27/80
[52] U.S. Cl. .................... 355/38; 355/40; 355/77
[58] Field of Search ............. 355/38, 40, 41, 68, 355/77; 354/21, 105, 109

[56] References Cited

U.S. PATENT DOCUMENTS

| | | | |
|---|---|---|---|
| 4,192,605 | 3/1980 | Fergg et al. | 355/38 |
| 4,339,517 | 7/1982 | Akimoto | 355/38 X |
| 5,016,039 | 5/1991 | Sosa et al. | 354/105 X |

FOREIGN PATENT DOCUMENTS 51-117632 10/1976 Japan .
52-13333  2/1977 Japan .
59-214023 12/1984 Japan .
64-6933   1/1989 Japan .

Primary Examiner—Michael L. Gellner
Assistant Examiner—D. Rutledge
Attorney, Agent, or Firm—Sughrue, Mion, Zinn, Macpeak & Seas

[57] ABSTRACT

A photographic printing method for printing a film image onto photographic paper by estimating the color temperature of a subject illuminant, and by changing, in correspondence with the color temperature estimated, a degree of correction of the image density in which an improper color balance occurs in color reproduction with a change in the color temperature of the subject illuminant. By changing the degree of correction in correspondence with the estimated color temperature, it is possible to allow the hues of the subject illuminant to be reflected on the prints. In addition, it is also possible to change the degree of correction in correspondence with the light-source-color information indicative of the photographer's intent in expressing the hues of the original scene. Furthermore, the light quality of the subject illuminant can be estimated from data on the date and time of photographing, a photographed district, a light value at the time of photographing, and information indicative of whether or not an electronic flash was used at the time of photographing, and print exposure amount can be determined in correspondence with the light quality estimated. In addition, by estimating the light quality of the subject illuminant and by determining an average image density from image densities of a plurality of frames photographed under a subject illuminant having specific light quality, it is possible to determine print exposure amount by using the average image density as a reference density.

23 Claims, 19 Drawing Sheets

F I G. 16
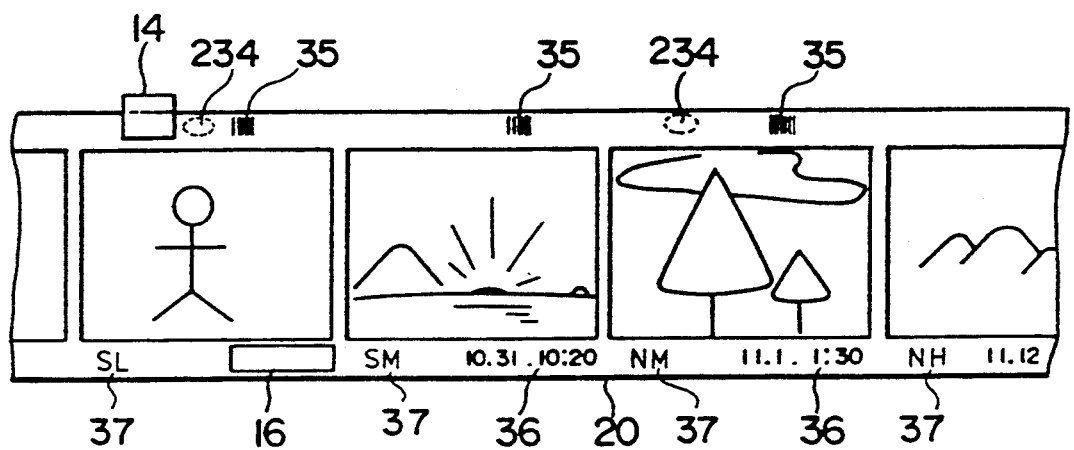

PHOTOGRAPHIC PRINTING METHOD

BACKGROUND OF THE INVENTION

1. Field of the Invention

The present invention relates to a photographic printing method for printing a film image onto photographic paper.

2. Description of the Related Art

It is empirically known that the ratios of transmittance of the three colors of light, blue (B), green (G), and red (R) transmitted through the overall image plane of a color negative on which a standard scene has been photographed occur, in general, at a substantially fixed rate. Printing conditions are determined in such a manner that a color obtained by integrating and mixing, with respect to the entire image plane, the densities of an image printed on color photographic paper by the transmitted light becomes gray or assumes a fixed hue, close to gray. For this reason, in an automatic printer the amount of light for printing (i.e., exposure amount) is determined on the basis of the following formula:

$$logEj = Kj + Dj \quad (1)$$

where logE is a logarithm of an amount of light for printing; K is a constant; D is a large area transmittance density (LATD) of the negative measured by a photometric system; and j is the light of any one of the colors B, G and R.

However, if the quantity of light for printing is controlled in an automatic printer on the basis of the aforementioned Formula (1), the overall density of a print from an underexposed negative on which a gray subject has been photographed becomes high in comparison with a print from an adequately exposed negative, while the density of a print from overexposed tricolor normalized data becomes low. For this reason, the exposure amount is determined by means of a slope control function so as to correct Dj in Formula (1). Meanwhile, in an automatic printer provided with the slope control function such as the one described above, an improper color balance is liable to occur in color reproduction, and a faulty print in which the color balance is inappropriate is hence liable to occur in the case of negatives photographed with a non-natural light source (fluorescent lamp, tungsten lamp, or the like) substantially different from daylight, negatives in which color failures have occurred, and other similar negatives. For this reason, Dj in Formula (1) is further corrected (color corrected) so as to determine the exposure amount. With respect to normal correction, an overcorrection is referred to as a high correction, and an undercorrection is referred to as a low correction.

By automatically correcting the exposure amount for printing as described above, it is possible to efficiently produce prints of good final print quality by correcting improper color balance in the color reproduction of a negative using a different type of light source and improper color balance in color reproduction caused by a change in film characteristics (performance change due to the extended storage of film or variations in processing, etc.).

However, since the above described photograhic printing method is premised on the uniform finishing of prints, a problem exists in that it is impossible to cause the hues of a subject illuminant and a photographer's picture-taking intent in expressing the hues of the original scene to be reflected on the print. For instance, an evening scene is undesirably converted to a broad daylight scene. To resolve this problem, it suffices to determine the exposure amount by means of a lowered correction, but the final print quality deteriorates since it is impossible to correct the improper color balance in color reproduction caused by a change in film characteristics.

Meanwhile, the print exposure amount at the time of printing a film image onto photographic paper is determined by the amount of light received by the film from the subject at the time of photographing, and differs for each frame. In order to obtain prints of good color reproducibility, correction of a print exposure amount corresponding to photographing conditions becomes necessary. For this reason, the photographing light quality and the light quantity of a light source are recorded outside of the image plane of the film, and the print exposure amount is corrected on the basis of these items of information (Japanese Patent Application Laid-Open Nos. 51-117632 and 52-13333). However, it is impossible to completely remove the light emitted from the background (e.g. a red curtain or blue sky), and information on the photographing light quality can change depending on development conditions and the like. Hence, there exists a problem in that it is impossible to accurately estimate the light quality, and color reproducibility consequently deteriorates due to a change in the light quality of the subject illuminant. In addition, Japanese Patent Application Laid-Open Nos. 59-214023 and 64-6933 disclose techniques in which data such as the shutter speed, aperture, date, time, place, title, whether or not the photograph was taken with a different type of light source, and so forth are recorded on the film so as to be utilized in determination of print exposure amount. With these techniques, however, since an algorithm for estimating the light quality of the subject illuminant has not been developed, it is impossible to accurately estimate the light quality, and there occurs the same problem as that described above. Furthermore, the determination of the light quality of a subject illuminant can also be determined by the operator of the printer. However, in order to improve the determining accuracy, long experience is necessary, and only the tungsten light which is easy to determine is, in practice, detected.

An additional task lies in improving the accuracy of determination in cases where a film is exposed at a place distant from the place for producing prints, as when a film photographed overseas is printed in the U.S.

Another photographic printing, method is conventionally known in which the average image dens multiplicity of frames (e.g., the frames of one roll of film) is calculated, and by using this average image density, the print exposure amount is determined on the basis of, for instance, the following Formula (2) so as to print the film images onto photographic paper:

$$logEj = Sj\{Cj(dj - dwj) + dwj\} + Kj \quad (2)$$

where $$dj = Dj - ADj \quad (3)$$

$$dwj = \left(\sum_{j=1}^{3} Dj\right)/3 \qquad (4)$$

where
- j integer selected from 1–3, representing any one of red (R), green (G) and blue (B)
- Dj: image density (e.g., an average density of the entire image plane) of an individual film image frame
- ADj: average image density (e.g., an average image plane density) of a multiplicity of film frames
- Sj: slope control value
- Cj: color correction value
- Kj: constant dependent on the printer, film, and photographic paper characteristics
- Ej: exposure control value corresponding to printing light quantity According to this method, since average image densities are used, the amount of density information is large, and it is possible to obtain prints of good color reproducibility as compared with cases where the print exposure amount is simply determined for each frame. With this method, if an average image density deviates substantially from a standard density, prints of good color reproducibility cannot be obtained, so that image densities of frames photographed under extremely different light sources, image densities of frames deviating substantially from gray, and other similar image densities are not used for the calculation of the average image density.

Conventionally, however, since the influence of the quality of light illuminating the subject is not sufficiently removed, average image densities of sufficient accuracy have yet been obtained. For instance, if consideration is given to electronic flashes, the color temperature of the light of electronic flashes and reciprocity law failure characteristics of films are not normalized and differ depending on products. Photographs taken using electronic flashes account for as much as 40% of the total number of shots on average. Accordingly, color reproducibility deteriorates if frames photographed without using an electronic flash are subjected to print exposure the use of an average image density including numerous image densities of frames photographed by using the electronic flash.

SUMMARY OF THE INVENTION

The present invention has been devised to overcome the above-described drawbacks, and has as its object to provide a photographic printing method capable of causing the hues of a subject illuminant or the photographer's picture-taking intent to be reflected in the prints without deteriorating the final print quality.

To this end, in accordance with a first aspect of the invention there is provided a photographic printing method for printing a film image onto photographic paper by correcting a print exposure amount determined on the basis of an image density of the film image, comprising the steps of: estimating the color temperature of a subject illuminant; and changing, in correspondence with the color temperature thus estimated, a degree of correction of the image density in which an improper color balance occurs in color reproduction with a change in the color temperature of the subject illuminant.

In accordance with the first aspect of the invention, when the estimated color temperature is not more than a predetermined value, an arrangement may be provided such that either the degree of correction is set to a low level or no correction is effected.

In accordance with the second aspect of the invention, there is provided a photographic printing method for printing a film image onto photographic paper by correcting print exposure amount determined on the basis of an image density of the film image, comprising the steps of: determining a photographer's picture-taking intent in expressing the hues of an original scene; and changing, in correspondence with the picture-taking intent, a degree of correction of the image density in which an improper color balance occurs in color reproduction with a change in the color temperature of the subject illuminant.

In this second aspect of the invention, light-source-color information used for estimating the color temperature of the subject illuminant may be recorded at the time of photographing, as necessary, and the presence or absence of the light-source-color information may be detected at the time of printing so as to determine the picture-taking intent.

The operation of the first and second aspects of the invention will be described hereinunder. When the color temperature of the subject illuminant undergoes change, the hues reproduced on the print change in the direction of the broken line in FIG. 2. FIG. 2 shows color coordinates expressed by the R-, G- , B-, Y- (yellow), C- (cyan), and M- (magenta) axes. Accordingly, according to the first aspect of the invention, in a photographic printing method for printing a film image onto printing paper by correcting a print exposure amount determined on the basis of image densities of the film image, if the color temperature of the subject illuminant is estimated, and the degree of correction of the image densities on the broken line in FIG. 2, or image densities within a predetermined range including the broken line L (e.g. a shadowed region R1 or R2 in FIG. 2), i.e., image densities in which an improper color balance occurs in color reproduction with a change in the color temperature of the subject illuminant, is changed in correspondence with the estimated color temperature, then it is possible to express the hues corresponding to the color temperature of the subject illuminant on the prints. Hence, an evening scene or the like can be expressed through automatic printing.

In the second aspect of the invention, the hues corresponding to the color temperature of the subject illuminant can be expressed properly on the prints if the degree of correction of the image densities on the broken line in FIG. 2, or image densities within a predetermined range including the broken line L (e.g. a shadowed region R1 or R2 in FIG. 2), i.e., image densities in which an improper color balance occurs in color reproduction with a change in the color temperature of the subject illuminant, is changed in correspondence with the photographer'picture taking intent. Hence, the photographer's picture-taking intent can be expressed. In this case, the correction of image densities in which an improper color balance does not occur in color reproduction with a change in the color temperature of the subject illuminant is effected in the same way as the prior art.

In addition, in cases where a subject illuminated with low-color-temperature light such as the setting sun, tungsten light, a wintry sun, the morning sun, a lamp was photographed, since it is in many cases desired to cause the hues of the subject illuminant or the photographer's picture-taking intent to be reflected on the prints, it suffices if the degree of correction is set to a low level, or no correction is effected. On the other hand, in cases where the photograph was taken with high-color-temperature light such as a cloudy sky, shortly before the sunrise, the shade, and so on, it is necessary to set the degree of correction to a high level so as to obtain good final print quality. For this reason, in the first aspect of the invention, when the estimated color temperature is not more than a predetermined value, i.e., when the subject illuminant light is low-color-temperature light, it is preferable to set the degree of correction to a low level or effect no correction.

In the second aspect of the invention, an arrangement may be provided such that the picture-taking intent is determined by detecting the presence or absence of the light-source-color information (picture-taking information) by recording on the film the light-source-color information (picture-taking information) used for estimating the color temperature of the subject illuminant when the picture-taking intent is to be reflected on the prints, or by not recording the light-source-color information (picture-taking information) on the film when the picture-taking intent is not to be reflected, i.e., by recording the light-source-color information (picture-taking information), as required.

As described above, in accordance with the first aspect of the invention, the degree of correction of image densities in which an improper color balance occurs in color reproduction with a change in the color temperature of the subject illuminant is changed in correspondence with the color temperature, and the degree of color temperature is not changed with respect to the remaining image densities. Accordingly, it is possible to obtain an advantage in that the hues of the subject illuminant can be reflected on the print properly.

In accordance with the second aspect of the invention, since the degree of correction of image densities in which an improper color balance occurs in color reproduction with a change in the color temperature of the subject illuminant is changed in correspondence with the picture-taking intent, and since the degree of correction is not changed with respect to the remaining image densities, it is possible to obtain an advantage in that the picture-taking intent can be reflected on the prints without deteriorating the final print quality.

The present invention in accordance with a third aspect thereof has been devised to overcome the above-described drawbacks, and has as its object to provide a photographic printing method capable of accurately estimating the light quality of a subject illuminant and producing prints of good color reproducibility.

To this end, in accordance with the third aspect of the invention, the light quality of the subject illuminant is estimated on the basis of the date and time of photographing, a light value at the time of photographing, and information indicative of the presence or absence of use of an electronic flash at the time of photographing, and a print exposure amount is determined in correspondence with the light quality estimated, thereby to print the film image onto photographic paper.

The present invention in accordance with a fourth aspect thereof which has been devised to overcome the above. described drawbacks, and has as its object to provide a photographic printing method capable of accurately estimating the light quality of the subject illuminant of the film photographed in a distant place and producing prints of good color reproducibility.

To this end, in accordance with the fourth aspect of the invention, the light quality of the subject illuminant is estimated on the basis of at least one of information indicative of the time and date of photographing and a photographing district on the one hand, information indicative of a light value at the time of photographing on the other, and information indicative of the presence or absence of use of an electronic flash at the time of photographing. A print exposure amount is determined in correspondence with the light quality estimated, thereby to print the film image onto photographic paper.

In both the third and fourth aspects of the invention, the light quality to be estimated may be selected from at least two of electronic flash light, low-color-temperature light, fluorescent lamp light, and daylight may be used as the light quality to be estimated.

In addition, an estimation may be made from the information indicative of the presence or absence of use of an electronic flash as to whether or not the subject illuminant is an electronic flash; an estimation may be made from the information indicative of the date and time of photographing as to whether or not the subject illuminant light is a low-color-temperature light when it is estimated that the subject illuminant is not an electronic flash; and an estimation may be made from the information indicative of a light amount at the time of photographing and a characteristic amount of an image density as to whether or not the subject illuminant is a fluorescent lamp when it is estimated that the subject illuminant is not an electronic flash.

In the third aspect of the invention, the light quality of the subject illuminant is estimated on the basis of the information indicative of the time and date of photographing, a photographing district, a light value at the time of photographing, and the presence or absence of use of an electronic flash at the time of photographing.

In the fourth aspect of the invention, the light quality of the subject illuminant is estimated on the basis of at least one of information indicative of the time and date of photographing and a photographing district on the one hand, and information indicative of a light value at the time of photographing on the other, and information indicative of the presence or absence of use of an electronic flash at the time of photographing.

In both the third and fourth aspects of the invention, since photographs taken by using electronic flashes account for as much as 40% of the total number of shots on an average, on the basis of the information indicative of the presence or absence of use of an electronic flash, it is possible to accurately estimate the light quality of the subject illuminant of approximately 40% of the total number of shots. When the electronic flash was not used, it is possible to ascertain the season, the photographing time, etc., or the season of the photographing district, the photographing time, etc., from the information indicative of the date and time of photographing, or from the information indicative of the date and time of photographing and the photographing district. If the photograph was taken in good weather, it is possible to accurately estimate the color temperature of the subject illuminant on the basis of these items of information. Hence, the light quality of the subject illuminant can be estimated accurately. In addition, it is possible to accurately estimate the color temperature by determining the weather, sunshine, shade, etc., from information indicative of the photographing light quantity value, i.e., an LV (EV), when the electronic flash was not used and from the information indicative of the date and time of photographing, or from the information indicative of the date and time of photographing and the photographing district, so as to estimate the light quality of the subject illuminant. In addition, in a state in which the electronic flash was not used, it is possible to estimate from the magnitude of the LV and the image density characteristic amount whether or not the subject illuminant is a fluorescent lamp.

After the light quality is estimated as described above, the print exposure amount is determined in correspondence with the light quality estimated, and the film image is printed onto photographic paper. In determining the print exposure amount, it is preferable to determine the print exposure amount separately for each different type of light quality.

In addition, when the color temperature of the subject illuminant undergoes change, the hues reproduced on the print change in the direction of the broken line in FIG. 2. FIG. 2 shows color coordinates expressed by the R-, G-, B-, Y- (yellow), C- (cyan), and M- (magenta) axes. Accordingly, when printing a film image onto printing paper by correcting a print exposure amount determined on the basis of image densities of the film image, if the degree of correction of the image densities on the broken line in FIG. 2, or image densities within a predetermined range including the broken line L (e.g. a shadowed region R1 or R2 in FIG. 2), i.e., image densities in which an improper color balance occurs in color reproduction with a change in the color temperature of the subject illuminant, is changed for each type of light quality, then it is possible to express the hues corresponding to the color temperature of the subject illuminant on the prints. In this case, the correction of image densities in which an improper color balance does not occur in color-reproduction with a change in the color temperature of the subject illuminant is effected in the same way as the prior art.

As described above, in accordance with the third aspect of the invention, since the light quality of the subject illuminant is estimated on the basis of the date and time of photographing, a light value at the time of photographing, and information indicative of the presence or absence of use of an electronic flash at the time of photographing, it is possible to obtain an advantage in that the light quality of the subject illuminant can be estimated accurately, so that prints of good color reproducibility can be obtained.

As described above, in accordance with the fourth aspect of the invention, the light quality of the subject illuminant is estimated on the basis of the information indicative of the time and date of photographing, the photographing district, a light value at the time of photographing, and information indicative of the presence or absence of use of an electronic flash at the time of photographing. Accordingly, in whatever district the film may have been photographed, it is possible to accurately estimate the light quality of the subject illuminant. Hence, it is possible to obtain prints of good color reproducibility.

The present invention in a fifth aspect thereof has been devised to overcome the above-described drawbacks, and has as its object to provide a photographic printing method capable of obtaining prints of good color reproducibility even if the light quality of the subject illuminant undergoes change.

To this end, in accordance with the present invention there is provided a photographic printing method for printing a film image onto photographic paper by storing an average image density obtained by photometrically measuring a plurality of frames before printing and by determining printing exposure amount by using that density as a reference density, comprising the steps of: determining the light quality of a subject illuminant; and determining the average image density from image densities of the plurality of frames photographed under the subject illuminant having specific light quality.

In addition, in a modified form of the fifth aspect of the invention, there is provided a photographic printing method for printing a film image onto photographic paper by storing an average image density obtained by photometrically measuring a plurality of frames before printing and by determining the printing exposure amount by using that density as a reference density, comprising the steps of: determining the light quality of a subject illuminant; and determining the average image density separately for each type of light quality estimated.

In this aspect of the invention, the print exposure amount is preferably determined for each type of light quality estimated.

In addition, it is preferable to estimate whether the subject illuminant light is an electronic flash light or daylight, to determine the average image density separately for the electronic flash light and daylight, and to determine the print exposure amount separately.

In the photographic printing method in the fifth aspect of the invention, at a time when a film image is printed onto photographic paper by storing an average image density obtained by photometrically measuring a plurality of frames before printing and by determining printing exposure amount by using that density as a reference density, the light quality of a subject illuminant is estimated, and the average image density is determined from image densities of the plurality of frames photographed under the subject illuminant having a specific light quality. As the subject illuminant having the specific light quality, it is possible to use daylight. The color temperature of the daylight has a standard value, and if an average image density is determined from image densities of the subject illuminated with the daylight, the average image density is prevented from deviating substantially from the standard value. By effecting printing by using this average image density, it is possible to obtain prints of good color reproducibility. As the subject illuminant having the specific light quality, it is possible to use a tungsten lamp, a fluorescent lamp, an electronic flash, or the like. Thus, by obtaining an average image density from the image densities of the subject illuminated with the subject illuminant having a specific light quality, the average image density of a subject image illuminated with such an illuminant becomes a standard value corresponding to the light quality of the illuminant. As a result, it is possible to obtain prints of good color reproducibility.

In addition, in the modified form of the fifth aspect of the invention, an average image density is determined separately for each type of light quality estimated. Accordingly, with respect to subject images illuminated with subject illuminants having identical or similar light quality, their average image densities assume standard values, so that it is possible to obtain prints of good color reproducibility, respectively. In cases where the average image density is determined separately for each type of light quality, it is preferable to determine the print exposure amount separately for each type of light quality. In addition, since photographs taken by using electronic flashes account for about 40% of the total number of shots, in determining the average image density separately for each type of light quality, it is preferable to determine the average image density separately depending on whether the subject illuminant is an electronic flash or daylight and to determine the print exposure amount in correspondence for the electronic flash and daylight. In addition, when the color temperature of the subject illuminant undergoes change, the hues reproduced on the print change in the direction of the broken line in FIG. 2. FIG. 2 shows color coordinates expressed by the R-, G-, B-, Y- (yellow), C- (cyan), and M- (magenta) axes. Accordingly, when printing a film image onto printing paper by correcting a print exposure amount determined on the basis of image densities of the film image, if the degree of correction of the image densities on the broken line in FIG. 2, or image densities within a predetermined range including the broken line L (e.g. a shadowed region R1 or R2 in FIG. 2), i.e., image densities in which an improper color balance occurs in color reproduction with a change in the color temperature of the subject illuminant, is changed for each type of light quality, then it is possible to express the hues corresponding to the color temperature of the subject illuminant on the prints. In this case, the correction of image densities in which an improper color balance does not occur in color reproduction with a change in the color temperature of the subject illuminant is effected in the same way as the prior art.

As described above, in accordance with the fifth aspect of the invention, since the average image density is determined only from the densities of the subject image illuminated with a subject illuminant having specific light quality, the average image density is prevented from deviating substantially from a standard value. Hence, the present invention offers an advantage in that prints of good color reproducibility can be obtained.

In addition, since average image densities are obtained separately for different types of light quality, the average image density for each type of light quality is prevented from deviating substantially from a standard value. In this aspect as well, it is possible to obtain the advantage that prints of good color reproducibility can be obtained.

The above and other objects, features and advantages of the present invention will become more apparent from the following detailed description of the invention when read in conjunction with the accompanying drawings.

BRIEF DESCRIPTION OF THE DRAWINGS

FIG. 16 is a plan view of a film on which picture-taking information, photographing-time information, and the like that are used in a fourth aspect of the invention have been stored;

DESCRIPTION OF THE PREFERRED EMBODIMENTS

Figure 3:
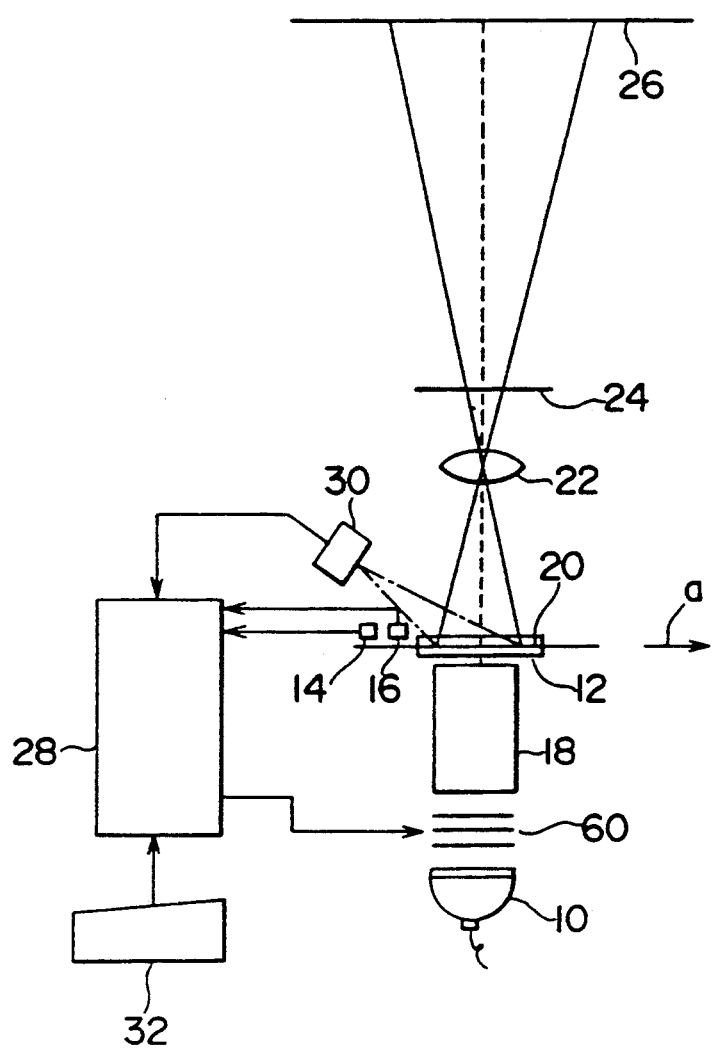
FIG. 3 is a diagram schematically illustrating an automatic color printer to which the present invention is applicable.

Referring now to the accompanying drawings, a detailed description will be given of an embodiment in accordance with a first aspect of the present invention. In this embodiment, the present invention is applied to a color photographic printer. As shown in FIG. 3, a mirror box 18 and a lamp house 10 having a halogen lamp are arranged below a negative carrier 12 for transporting a negative film 20 to a printing section. A light-adjusting filter 60 is interposed between the mirror box 18 and the lamp house 10. The light-adjusting filter 60 comprises three color filters, a yellow (Y) filter, a magenta (M) filter, and a cyan (C) filter in a conventional manner.

A lens 22, a black shutter 24, and a color print paper 26 are arranged in order above the negative carrier 12. The arrangement is such that a beam of light which is applied from the lamp house 10 and is transmitted through the light-adjusting filter 60, the mirror box 18, and the negative film 20 forms an image on the color print paper 26 by means of the lens 22.

A two-dimensional image sensor 30 is disposed in a direction inclined with respect to the optical axis of the above-described image-forming optical system and at a position where image densities of the negative film 20 can be photometrically measured.

Figure 4:
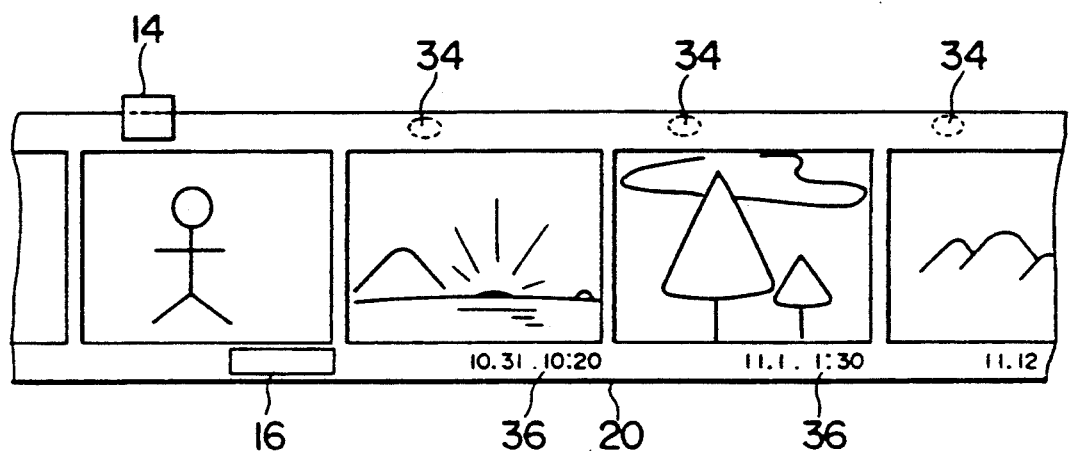
FIG. 4 is a plan view of a film on which light-source-color information (picture-taking information), photographing-time information, and the like that are used in first and fifth aspects of the invention have been stored.

As shown in FIG. 4, light-source-color information 34 has been recorded on the negative film 20, and photographing-time information 36 indicative of the time when the picture was taken has been printed thereon. The light-source-color information 34 can be recorded at a position outside an image frame corresponding to the image plane on which the subject was photographed, by imparting to that position an exposure of the same amount as the subject exposure amount or at a fixed rate. This light-source-color information 34 is used in the estimation of the color temperature of a subject illuminant which will be described later. Instead of this light-source-color information, information indicative of a light amount value at the time of photographing, i.e., a light value (LV) (exposure value (EV)), may be recorded by means of numerals, codes, bar codes, or the like. As the photographing-time information 36, the date (year may or may not be added) and time of picture taking are used, and this photographing-time information is printed at the time of photographing by making use of a date- and time-add-on mechanism of the camera.

In FIG. 4, the photographing-time information is shown by numerals, but may be recorded by means of bar codes, or optical marks displayed by a light-emitting diode or the like may be used. Furthermore, the position where information is recorded on the film is not restricted to the position shown in FIG. 4. For instance, by omitting perforations on one side of the film and by providing an information recording portion on that side at positions corresponding to each interval between adjacent ones of film image frames, recording may be effected on the information recording portion.

Figure 19:
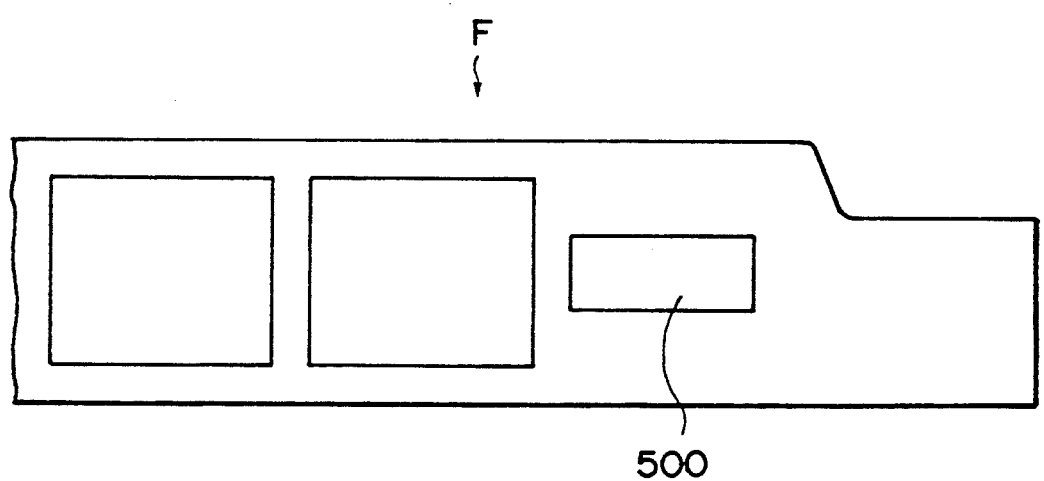
FIG. 19 is a plan view of a negative film on which magnetic tape is attached.
Figure 20:
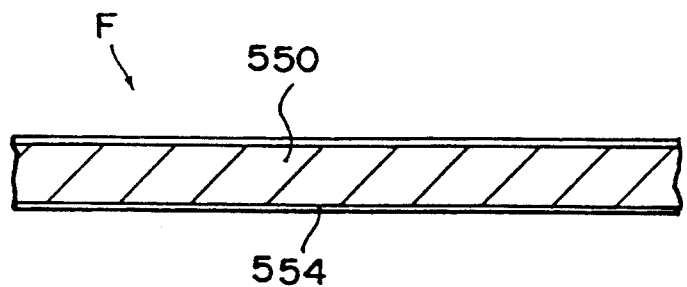
FIG. 20 is a cross-sectional view of a negative film provided with a magnetic recording layer.
Figure 21:
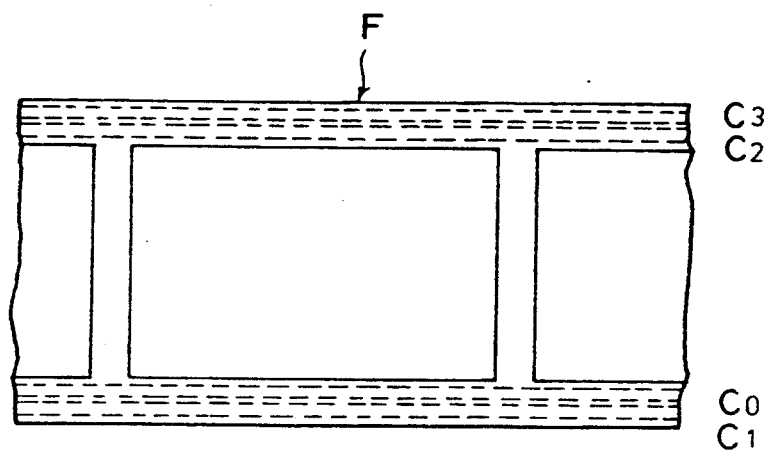
FIG. 21 is a plan view of a negative film having a plurality of tracks formed on a magnetic recording layer.

Although in the above a description has been given of an example in which photographing-time information is recorded on the film, an arrangement may be alternatively provided such that the information is stored in a magnetic recording portion connected to the film or in a storage means attached to the film, such as a magnetic card, an IC card, an IC, or the like. In addition, a magnetic tape 500 may be attached to the film, as shown in FIG. 19, or a transparent magnetic paint may be applied to an adjacent surface of a transparent base 550 of a film F so as to provide a magnetic recording layer 554, as shown in FIG. 20, and the information may be stored in these magnetic material portions. Furthermore, as shown in FIG. 21, it is possible to form on the magnetic recording layer 554 a plurality of tracks (C0−C3) for recording by a recording head (not shown) in such a manner as to be formed continuously in the longitudinal direction of the negative film F outside the image frames thereof.

Returning to FIG. 3, first sensor 14 for optically reading the light-source-color information 34 and a second sensor 16 for optically reading the photographing-time information 36 are disposed upstream of the negative carrier 12 at positions where they are capable of reading the information recorded on the film. The first sensor 14, the second sensor 16, and the two-dimensional image sensor 30 are connected to a control circuit 28 composed of a microcomputer. A keyboard 32 for inputting data and the like is connected to the control circuit 28. The control circuit 28 is connected so as to control the light-adjusting filter 60.

A description will now be given of a routine for printing control by the microcomputer.

Figure 1:
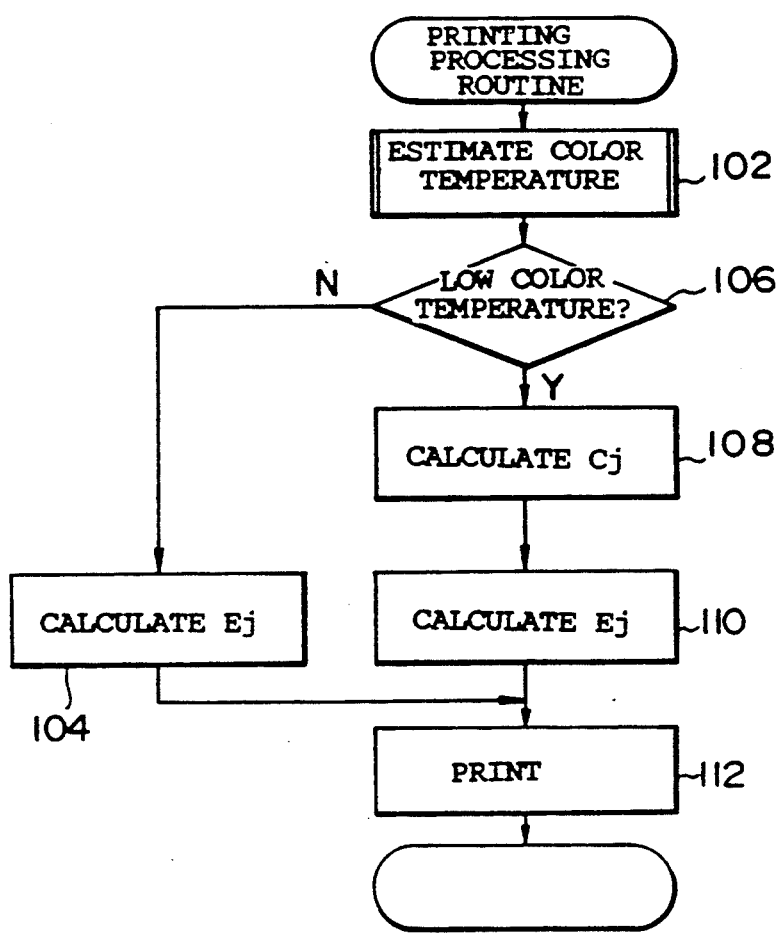
FIG. 1 is a flowchart illustrating a printing processing routine of an embodiment in accordance with a first aspect of the invention.
Figure 2:
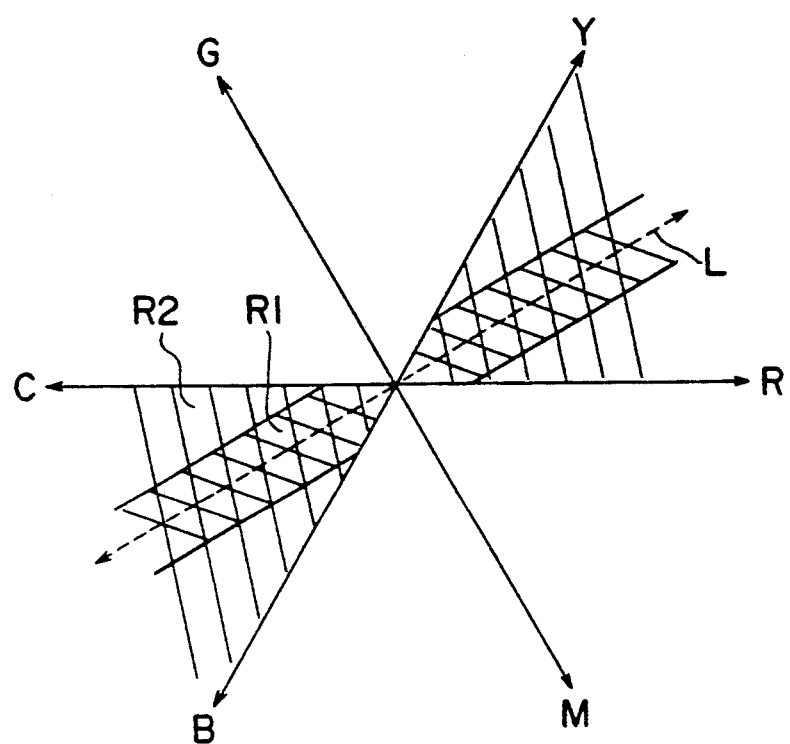
FIG. 2 is a diagram illustrating the direction of an improper color balance in color reproduction due to a change in the color temperature of a subject illuminant.

FIG. 1 illustrates a printing processing routine in accordance with the embodiment of the first aspect. In Step 102, the color temperature of the subject illuminant is estimated from the light-source-color information detected by the first sensor 14, or from the photographing-time information detected by the second sensor, or from a combination of both. A detailed routine for this color temperature estimation will be described later. In an ensuing Step 106, a determination is made as to whether or not the color temperature of the subject illuminant is not more than a predetermined value (e.g. not more than 4,500° K.), i.e., whether or not the color temperature of the subject at the time of photographing is low. If it is not the low color temperature, i.e., if the subject-illuminating light is high-color-temperature light or standard light, printing is effected by using only the automatic correcting function of the printer, so that, in Step 104, an exposure control value Ej is calculated on the basis of, for instance, Formula (5) given below. Then, in Step 112, printing is effected by controlling the light-adjusting filter 60 on the basis of the exposure control value Ej.

$$logEj = Sj\{Cj(dj-dwj)+dwj\}+Kj \qquad (5)$$

where $$dj = Dj - NDj \qquad (6)$$

$$dwj = \left(\sum_{j=1}^{3} Dj\right)/3 \qquad (7)$$

where
- j: integer selected from 1–3, representing any one of R, G, and B
- Dj: image-density (e.g., an average density of the entire image plane) of a film image frame to be printed
- NDj: average image density (e.g., an average image plane density) of a standard negative film or a multiplicity of film frames
- Sj: slope control value
- Cj: color correction value
- Kj: constant dependent on the printer, film, and photographic paper characteristics
- Ej: exposure control value corresponding to printing light quantity When it is determined in Step 106 that the color temperature of the subject illuminant is not more than the predetermined value, i.e., at a time when the hues of the subject illuminant are to be reflected on the print, in Step 108, the color correction value Cj of the image density in which hues vary due to the variation of the color temperature of the subject illuminant is set to a value smaller than in the case of Step 104. By setting the color correction value Cj at a low level, in cases where the subject has been illuminated with a low-color-temperature light (e.g. the setting sun, tungsten light, etc.), the correction through the color correction value Cj becomes weak or no correction is carried out. That is, printing is effected by low correction. For instance, if it is assumed that the color correction value $Cj \approx 0.5$, the correction of color failure is executed, but the light-source-color correction fails to be effected, so that the color of tungsten light, for instance, is reproduced as a strongly YR-ish color. In the case of a weak high correction, on the other hand, if the color correction value $C_j=1.3$, for instance, the color failure correction fails to be effected and only the light-source-color correction is effected, so that if the subject illuminant is a tungsten lamp, the color of tungsten light remains. As described above, by effecting the correction through a color correction value at a weak level or by conducting no correction by the color correction value at all, it is possible to have the hues of the subject illuminant reflected on the prints. At this juncture, the color correction value $C_j$ of the image density (image density outside the shadowed portion in FIG. 2) in which hues do not change by the color temperature of the subject illuminant is set at the same value as that of Step 104.

Subsequently, in Step 110, the exposure control value $E_j$ is calculated on the basis of Formula (5) above, and printing is executed in Step 112.

Figure 5:
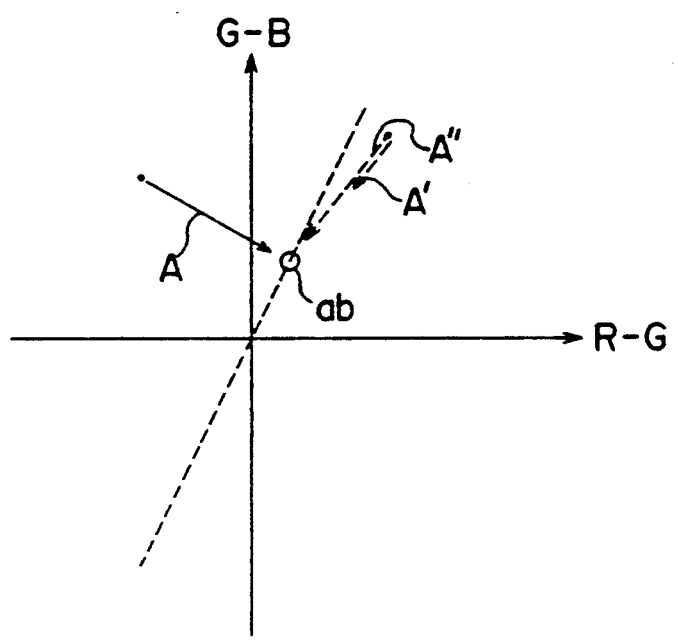
FIG. 5 is a diagram explaining the degree of contribution of image data at a time when a color correction value is changed.

In FIG. 5, vector A shows the degree of contribution, to exposure control values, of image densities including the hues of the subject illuminant at a time when the color correction value $C_j$ is set at a low level (e.g. 0.5). Vector A' shows the degree of contribution, to exposure control values, of image densities at a time when the color correction value is slightly greater than 1 (e.g. 1.3), while Vector A" shows the degree of contribution, to exposure control values, of image densities at a time when the color correction value is large (e.g. 2.0). As can be appreciated from the diagram, of FIG. 5 correction is effected in such a manner that the image density approaches an average image density ab as the degree of correction becomes smaller.

Figure 6:
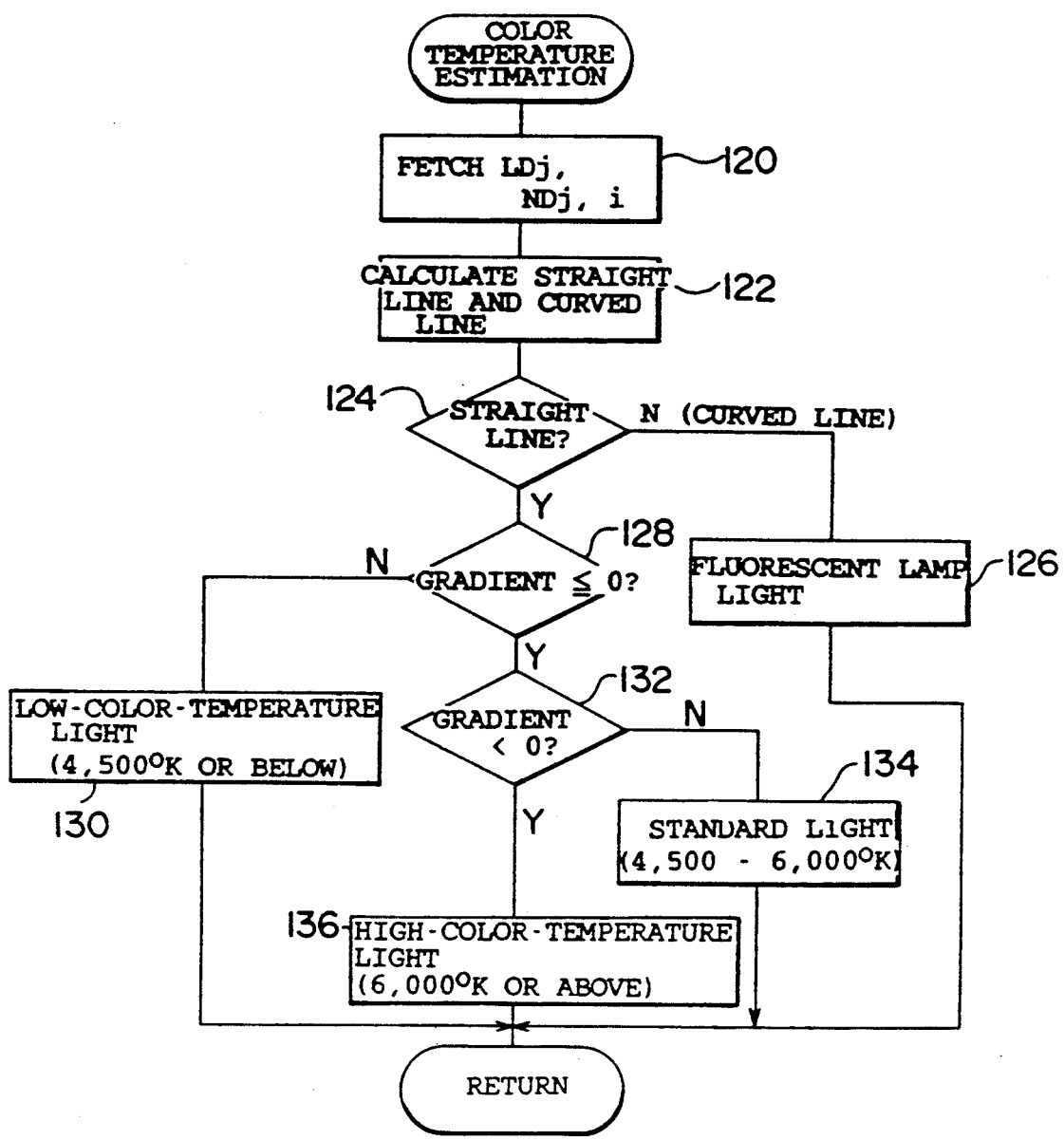
FIG. 6 is a flowchart illustrating a routine of a first method for estimating a color temperature.
Figure 7:
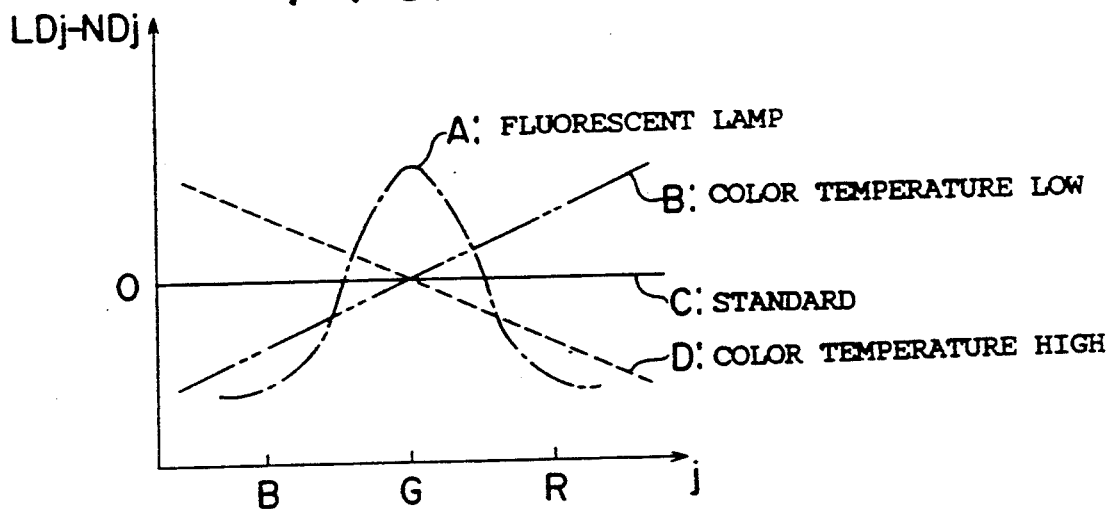
FIG. 7 is a diagram explaining the first method.

A description will now be given of a method of estimating the color temperature. First, a first estimation method will be described with reference to FIGS. 6 and 7. In this case, the light-source-color information 34 is recorded in advance at a position outside an image frame corresponding to the image plane on which the subject was photographed, by imparting to that position an exposure of the same amount as the subject exposure amount or at a fixed rate with respect to the subject exposure amount. FIG. 7 shows the relationships between the image density j on the one hand, and the difference between the average image density $ND_j$ and the exposure amount density (light-source-color density) $LD_j$ outside the image plane caused by the subject illuminant on the other. As can be appreciated from FIG. 7, if the color temperature of the subject illuminant is low, the relationship between a color difference $LD_j-ND_j$ and a color j is expressed by a straight line B with a positive gradient; if the color temperature is high, the relationship is expressed by a straight line D with a negative gradient; and if the color temperature is a standard color temperature, the relationship is expressed by a straight line C parallel with the j-axis. In addition, if the subject illuminant is a fluorescent lamp, the relationship is expressed by a curved line A with its middle portion projecting upward. Accordingly, in the color-temperature estimation routine shown in FIG. 6, Step 120 fetches, the light-source-color density $LD_j$, the average image density $ND_j$, and the image density j. In Step 122, a calculation is made to determine whether the fetched data shows any of the straight lines B C or the curve A on the basis of the fetched data. In Step 124, a determination is made as to whether or not the result of determination shows a straight line. If it is not a straight line, i.e., if it is a curved line, it is determined in Step 126 that the light quality is the fluorescent lamp light, and the result is stored in a predetermined area of a RAM.

If it is determined in Step 124 that the result of determination shows a straight line, a determination is made in Steps 128 and 132 as to whether the gradient is positive or negative. If the gradient is positive, it is determined in Step 130 that the light is the low-color-temperature light (e.g. light having a color temperature of 4,500° K. or less); if the gradient is negative, it is determined in Step 136 that the light is the high-color-temperature light (e.g. light having a color temperature of 6,000° K. or more); and if the gradient is 0, it is determined in Step 134 that the light is the standard light (e.g. light having a color temperature in the range of 4,500°–6,000° K.), the result being respectively stored in the predetermined area of the RAM.

Figure 8:
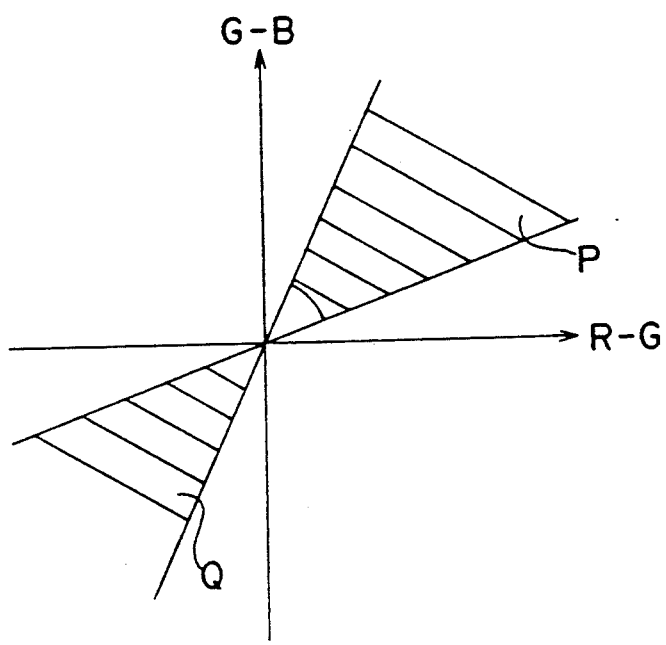
FIG. 8 is a diagram explaining a second method for estimating the color temperature.

In a second method of color temperature estimation, average image densities R, G, and B are employed. As shown in FIG. 8, if the color difference R-G is set as the abscissa and the color difference G-B as the ordinate, a region P existing in the first quadrant is a region where a color difference in the low-color-temperature light is present, while a region Q existing in the third quadrant is a region where a color difference in the high-color-temperature light is present. Accordingly, if after fetching the average image densities, a determination is made regarding to which of the regions P and Q the differences between average image densities, G-B, R-G, belong, it is possible to determine whether the color temperature of the subject illuminant is high or low, i.e., the light quality of the subject illuminant.

Figure 9:
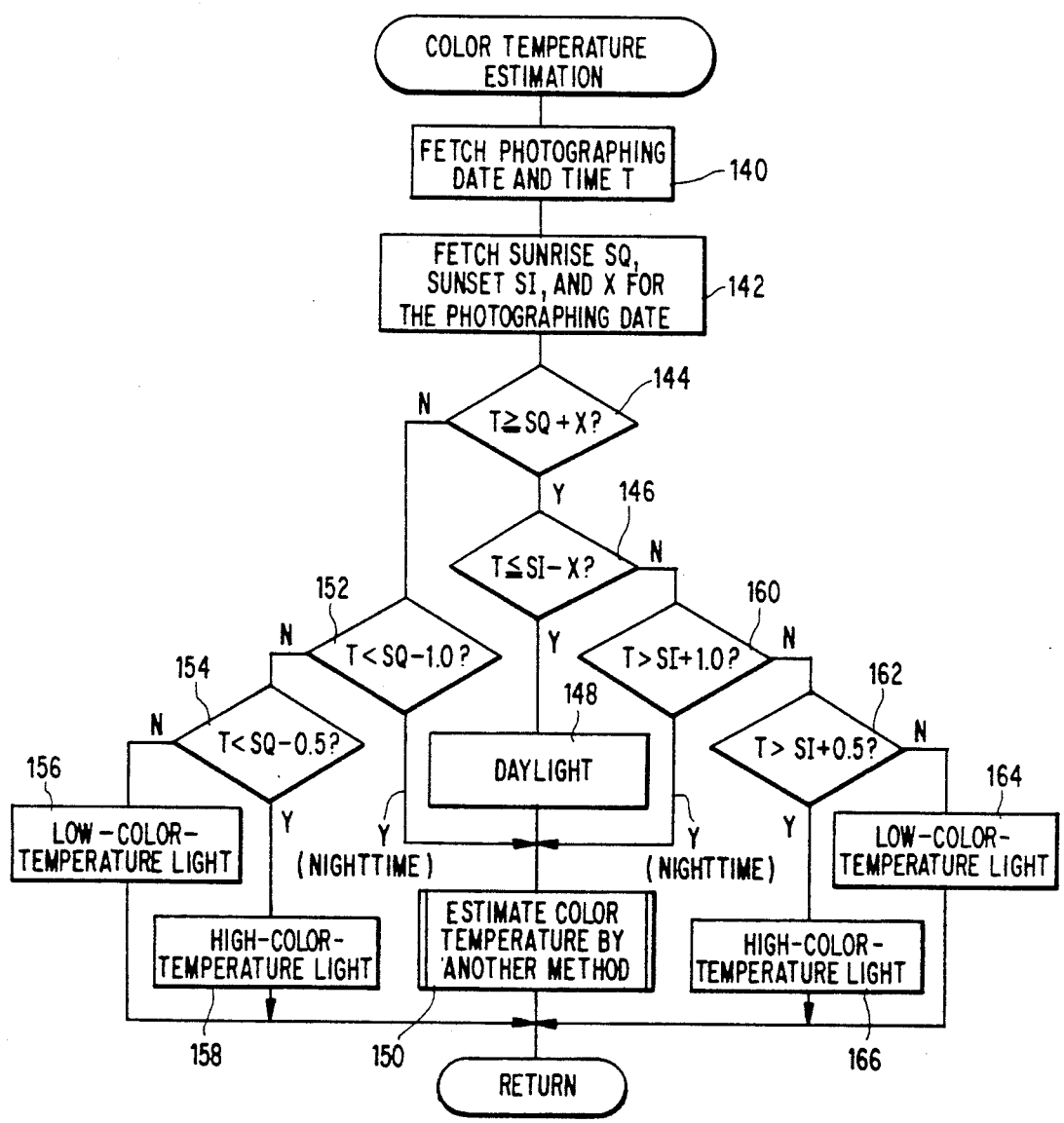
FIG. 9 is a flowchart illustrating a routine of a third method for estimating the color temperature.

A description will now be given of a third method of color temperature estimation. In this method, the photographing-time information, i.e., the date and time of picture taking, are used. In cases where this method is utilized, the time of sunrise SQ, the time of sunset SI for each date in a district where the printer is located, and a time duration X until the sun rises high are set in the printer with respect to each season. This time duration X is set to, for instance, 1 in the case of summer season, 3 in the case of winter season, 1 in a case where the district is a southern district, and 3 in a case where the district is a northern district. Referring to FIG. 9, a description will be given of a routine for estimating the color temperature. In Step 140, the photographing date and the photographing time T are fetched by fetching the photographing-time information 36. In Step 142, the time of sunrise SQ, the time of sunset SI, and the time duration X corresponding to the photographing date are fetched. In Step 144, a comparison is made between the photographing time T and the time after the lapse of the time duration X from sunrise, i.e., $SQ+X$. In Step 146, a comparison is made between the photographing time T and the time the X time duration before sunset, i.e., $SI-X$. If $SQ+X \leq T \leq SI-X$, it is determined that the subject illuminant light is daylight, and the fact that it is daylight is stored in the RAM in Step 148. In Step 150, the color temperature is estimated by using the above-described method of color temperature estimation, or the like.

If $T<SQ+X$, comparisons are made in Steps 152 and 154 between the photographing time and the time an hour before sunrise, $SQ-1.0$, and between the photographing time and the time a 0.5 hour before sunrise, $SQ-0.5$, respectively. If $T<SQ-1.0$, it is determined that the time is nighttime, and the operation proceeds to Step 150. In addition, if $SQ-1.0 \leq T < SQ-0.5$, since the time is between 30 minutes to one hour before sunrise, it is determined in Step 158 that the color temperature is high, i.e., the subject illuminant light is high-color-temperature light. Meanwhile, if $SQ+X > T \geq SQ-0.5$, since the time is between 30 minutes before sunrise and the time when the sun rises high, it is determined in Step 156 that the color temperature is low, i.e., the subject illuminant light is low-color-temperature light.

If $T > SI-X$, comparisons are made in Steps 160 and 162 between the photographing time and the time a 0.5 hour after sunset, $SI+0.5$, and between the photographing time and the time an hour after sunset, $SI+1$, respectively. Then, if the photographing time T has elapsed one hour after sunset, it is determined that the time is nighttime, and the operation proceeds to Step 150. Meanwhile, if the time is between the 0.5 hour to one hour after sunset, it is determined that the color temperature is high (high-color-temperature light), and the operation proceeds to Step 166. If $SI-X < T \leq SI+0.5$, it is determined that the color temperature is low (low-color-temperature light), and the operation proceeds to Step 164. In the respective cases, each color temperature is stored in the RAM.

Figure 10:
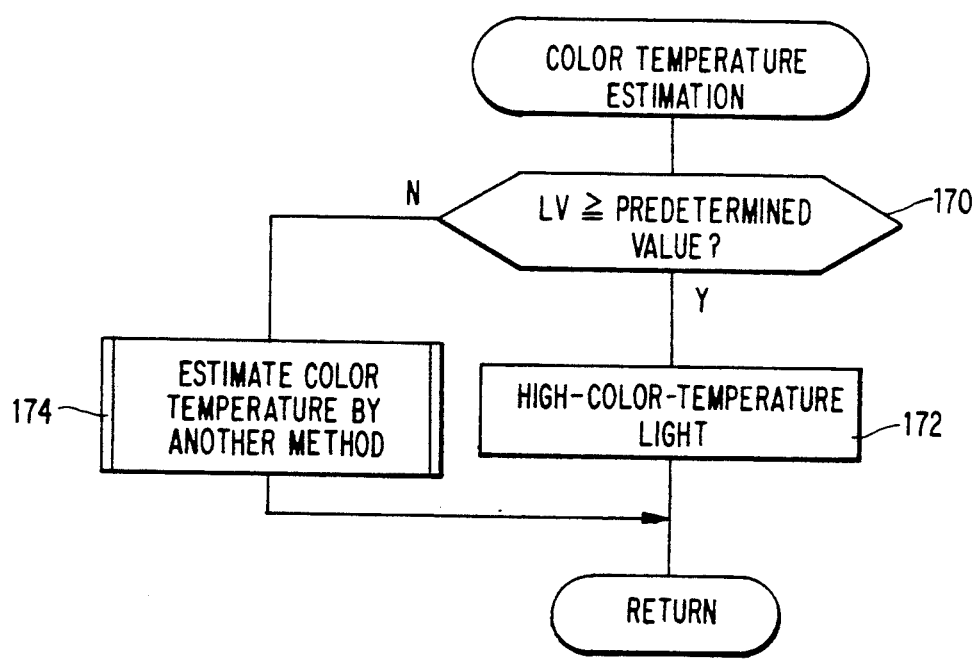
FIG. 10 is a flowchart illustrating a routine of a fourth method for estimating the color temperature.

A description will now be given of a fourth method of estimating the color temperature. In this method, the light value LV (exposure value (EV)), i.e., the light quantity value at the time of picture taking, is employed. A yellow background and low-color-temperature light are discriminated from each other by making use of the fact that the low-color-temperature light is not bright and has a small LV. The light quantity value at the time of photographing is recorded on the film. With reference to FIG. 10, a determination is made in Step 170 as to whether or not the LV is not less than a predetermined value, and if the LV is the predetermined value, it is determined that the color temperature is high (high-color-temperature light), the result being stored in the RAM in Step 172. In addition, if the LV is less than the predetermined value, the color temperature is estimated in accordance with any of the other methods described above.

By combining the above-described second and fourth methods, or by combining the second, third, and fourth methods, it is possible to estimate with high accuracy whether or not the subject illuminant employed is a tungsten lamp or fluorescent lamp.

Although in the above embodiment a description has been given of an example in which the light-source-color information, photographing-time information, and so on are recorded on a film, an arrangement may be alternatively provided such that the information is stored in a magnetic recording portion connected to the film or in a storage means attached to the film, such as a magnetic card, an IC card, an IC, or the like.

In addition, the magnetic tape 500 may be attached to the film, as shown in FIG. 19, or a transparent magnetic paint may be applied to an adjacent surface of the transparent base 550 of the film F so as to provide the magnetic recording layer 554, as shown in FIG. 20, and the information may be stored in these magnetic material portions. Furthermore, as shown in FIG. 21, it is possible to form on the magnetic recording layer 554 the plurality of tracks (C0−C3) for recording by a recording head (not shown) in such a manner as to be formed continuously in the longitudinal direction of the negative film F outside the image frames thereof.

Figure 11:
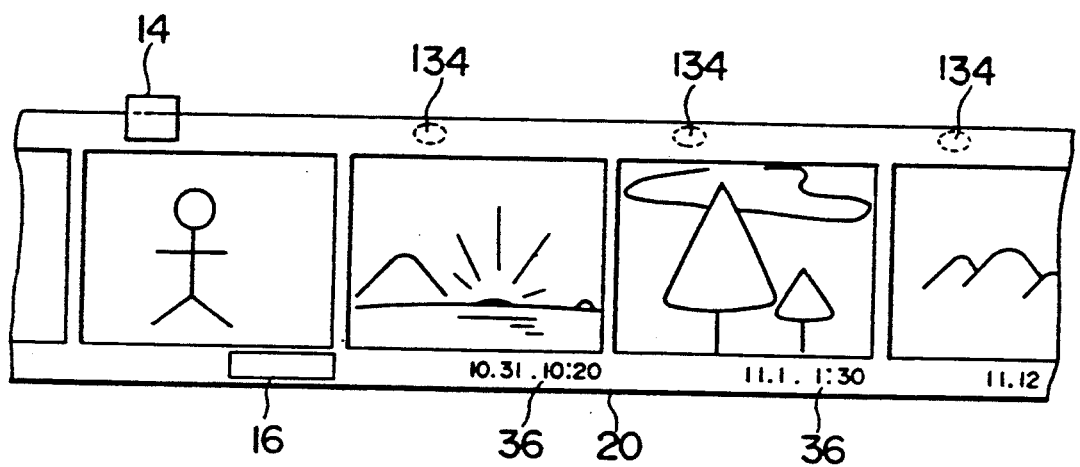
FIG. 11 is a plan view of a film on which picture-taking information, photographing-time information, and the like that are used in a second aspect of the invention have been stored.
Figure 12:
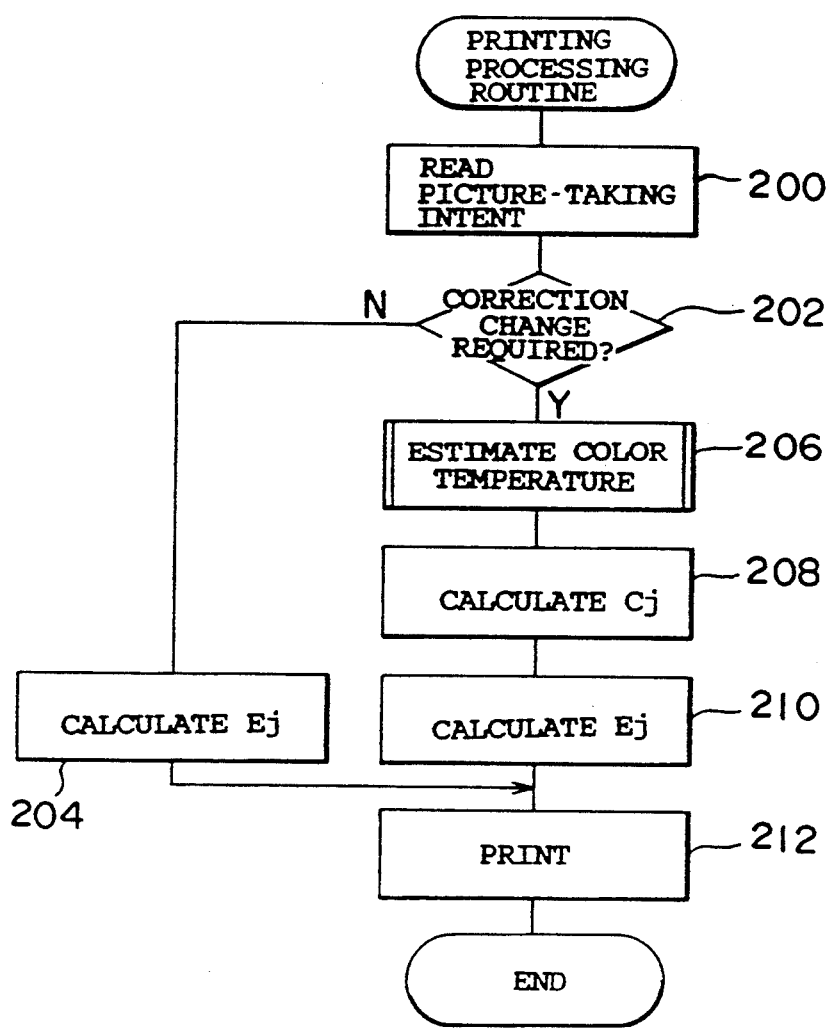
FIG. 12 is a flowchart illustrating a printing processing routine of an embodiment in accordance with the second aspect of the invention.

Referring now to FIGS. 11 and 12, a detailed description will be given of an embodiment in accordance with a second aspect of the present invention. In FIG. 11, components or portions that are identical with or equivalent to those of the above-described embodiment in accordance with the first aspect of the invention are denoted by the same reference numerals, and a description thereof will be omitted. In this embodiment as well, the present invention is applied to the color photographic printer shown in FIG. 3.

As shown in FIG. 11, picture-taking information 134 indicative of the photographer's picture-taking intent in expressing the hues of the original scene has been recorded on the negative film 20, and the photographing-time information 36 indicative of the time when the picture was taken has been printed thereon. The picture-taking information 134 suffices so long as it makes it possible to confirm at least whether or not the change of exposure amount correction is required, and it is possible to record information on whether or not the change of correction is required. Alternatively, an arrangement may be provided such that the picture-taking information 134 is used jointly with the photographing-time information 36, LV (EV) information, light-source-color information, and the like, which are used for estimation of the color temperature of the subject illuminant, and a determination is made that the correction of exposure amount is required, i.e., the picture-taking intent is to be reflected, when any of these items of information is present.

The first sensor 14 for optically reading the picture taking information 134 and the second sensor 16 for optically reading the photographing-time information 36 are disposed upstream of the negative carrier 12 at positions capable of reading the information recorded on the film. The first sensor 14, the second sensor 16, and the two-dimensional image sensor 30 are connected to the control circuit 28 composed of a microcomputer. The keyboard 32 for inputting data and the like is connected to the control circuit 28. The control circuit 28 is connected so as to control the light-adjusting filter 60.

A description will now be given of a routine for printing control by the microcomputer.

FIG. 12 illustrates a printing processing routine in accordance with the embodiment of the second aspect. In Step 200, the picture-taking information 134 detected by the first sensor 14 is read. In Step 202, a determination is made on the basis of the picture-taking information as to whether or not the picture-taking intent is to be reflected on the print, i.e., whether or not the change of correction is required. When the change of correction is not required, i.e., when printing is effected by using only the automatic correcting function of the printer, in Step 204, the exposure control value Ej is calculated on the basis of, for instance, Formula (8) given below. Then, in Step 212, printing is effected by controlling the light-adjusting filter 60 on the basis of the exposure control value Ej.

$$logEj = Sj\{Cj(dj-dwj)+dwj\}+Kj \qquad (8)$$

where $$dj = Dj - NDj \qquad (9)$$

$$dwj = \left(\sum_{j=1}^{3} Dj\right)/3 \qquad (10)$$

where

- j: integer selected from 1-3, representing any one of R, G, and B
- Dj: image density (e.g., an average density of the entire image plane) of a film image frame to be printed
- NDj: average image density (e.g., an average image plane density) of a standard negative film or a multiplicity of film frames
- Sj: slope control value
- Cj: color correction value
- Kj: constant dependent on the printer, film, and photographic paper characteristics
- Ej: exposure control value corresponding to printing light quantity When it is determined in Step 202 that a change of correction is required, i.e., when the picture-taking intent is to be reflected on the print, in Step 206, the color temperature of the subject illuminant is estimated. Since the detailed routine for estimating the color temperature is the same as that described in the embodiment in accordance with the first aspect of the invention, a detailed description thereof will be omitted.

In Step 208, the color correction value Cj of the image density in which the hues change due to a change in the color temperature of the subject illuminant is set on the basis of the color temperature estimated. This color correction value Cj is set in such a manner that if the estimated color temperature is not more than a predetermined value, i.e., the subject has been illuminated with low-color-temperature light (e.g. the setting sun, tungsten light, etc.), then the correction through the color correction value Cj becomes weak or no correction is carried out. That is, a setting is provided such that printing is effected by low correction. For instance, if it is assumed that the color correction value Cj≈0.5, the correction of color failure is executed, but the light-source-color correction fails to be effected, so that the color of tungsten light is reproduced as a strongly YR-ish color. In the case of a weak high correction, on the other hand, if the color correction value Cj=1.3, for instance, the color failure correction fails to be effected and only the light-source-color correction is effected, so that if the subject illuminant is a tungsten lamp, the color of tungsten light remains. As described above, by effecting the correction through a color correction value at a weak level or by conducting no correction by the color correction value at all, it is possible to have the hues of the subject illuminant reflected on the prints, and produce prints in correspondence with the picture-taking intent. A setting is provided such that a high correction is effected when the estimated color temperature is high-color-temperature light (e.g. a cloudy sky, the shade, etc.). For instance, if the color correction value Cj is set to 2.0, only the light-source correction is carried out in the same way as described above, and the tungsten lamp light is printed into a daylight color.

At this juncture, the color correction value Cj of the image density (image density outside the shadowed portion in FIG. 2) in which hues do not change by the color temperature of the subject illuminant is set at the same value as that of Step 204.

Subsequently, in Step 210, the exposure control value Ej is calculated on the basis of Formula (8) above, and printing is executed in Step 212.

Since the degree of contribution, to exposure control values, of image densities including the hues of the subject illuminant at a time when the color correction value Cj is varied is shown in FIG. 5 and is the same as that given in the description of the embodiment in accordance with the first aspect of the invention, a description thereof will be omitted.

It should be noted that the methods of estimating the color temperature are the same as those described above, and in this embodiment the picture-taking information can be recorded at a position outside an image frame corresponding to the image plane on which the subject was photographed, by imparting to that position an exposure of the same amount as the subject exposure amount or at a fixed rate.

In the same way as the embodiment in accordance with the first aspect of the invention, by combining the above-described second and fourth methods, or by combining the second, third, and fourth methods, it is possible to estimate with high accuracy whether or not the subject illuminant employed is a tungsten lamp or fluorescent lamp.

In addition, the magnetic tape 500 may be attached to the film, as shown in FIG. 19, or a transparent magnetic paint may be applied to an adjacent surface of the transparent base 550 of the film F so as to provide the magnetic recording layer 554, as shown in FIG. 20, and the information may be stored in these magnetic material portions. Furthermore, as shown in FIG. 21, it is possible to form on the magnetic recording layer 554 the plurality of tracks (C0—C3) for recording by an unillustrated recording head in such a manner as to be formed continuously in the longitudinal direction of the negative film F outside the image frames thereof.

Figure 13:
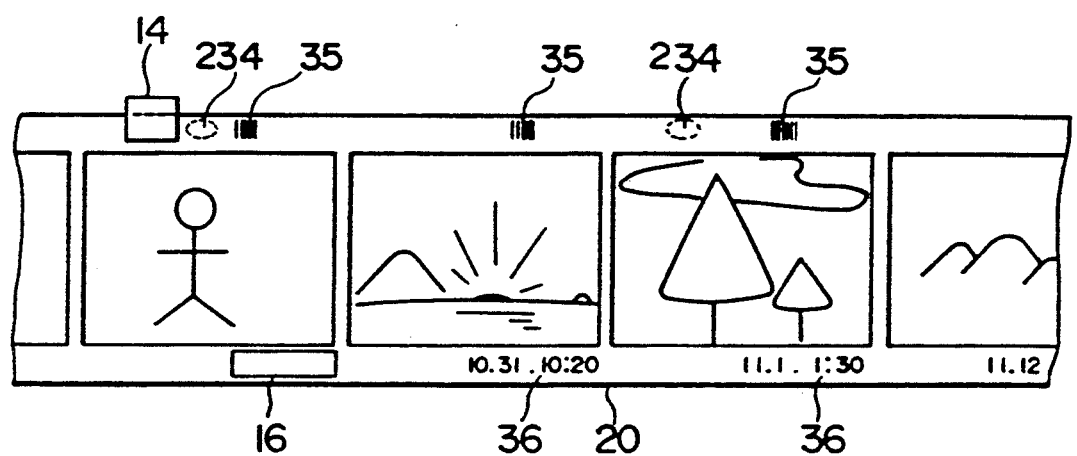
FIG. 13 is a plan view of a film on which picture-taking information, photographing-time information, and the like that are used in a third aspect of the invention have been stored.
Figure 14:
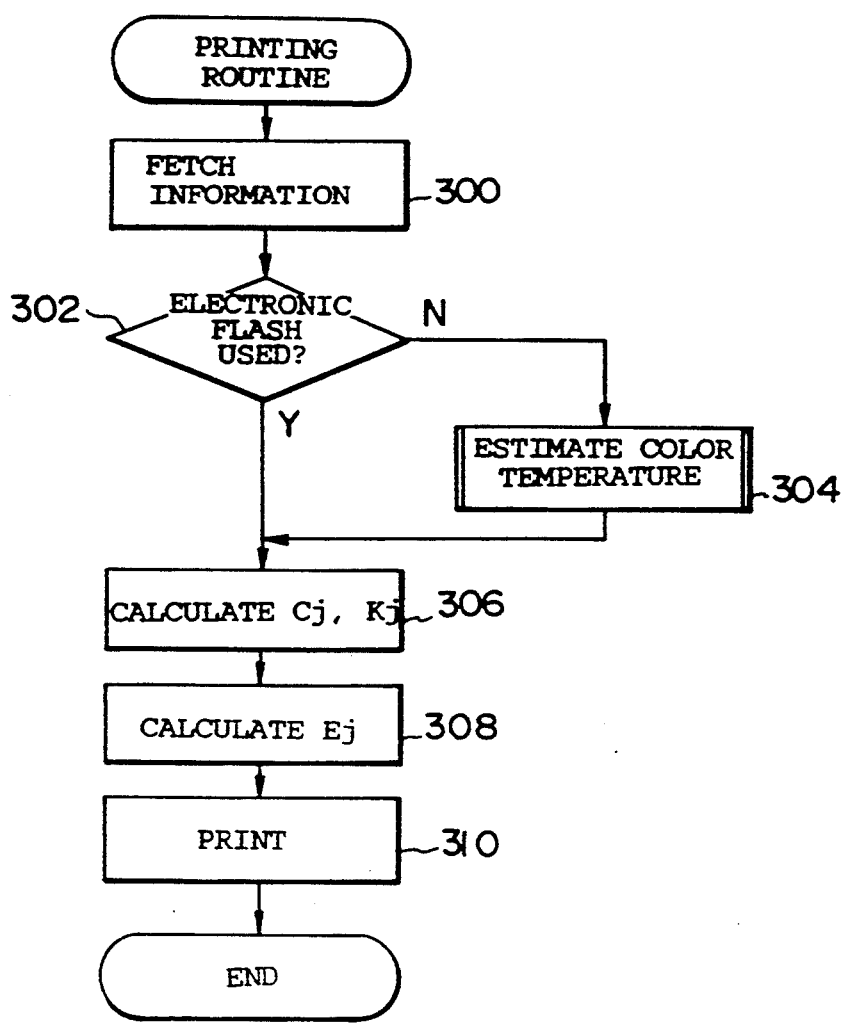
FIG. 14 is a flowchart illustrating a printing processing routine of an embodiment in accordance with the third aspect of the invention.

Referring now to FIGS. 13 and 14, a detailed description will be given of an embodiment in accordance with a third aspect of the present invention. In FIG. 13, components or portions that are identical with or equivalent to those of the above-described embodiment in accordance with the first aspect of the invention are denoted by the same reference numerals, and a description thereof will be omitted. In this embodiment as well, the present invention is applied to the color photographic printer shown in FIGS. 3.

As shown in FIG. 13, information 234 indicative of presence the use of an electronic flash and information 35 indicative of an LV have been recorded on the negative film 20, and the photographing-time information 36 indicative of the date and time of picture taking has been printed thereon. The information 234 indicative of the presence of use of the electronic flash is recorded by a mark or the like at the time when the electronic flash was used, while the LV at the time of photographing is recorded by a bar code as the information 35 indicative of the LV. In addition, as the photographing-time information 36, the date (year may or may not be added) and time of picture taking are used, and this photographing-time information is printed at the time of photographing by making use of the date- and time-adding-on mechanism of the camera.

Although in FIG. 13 the information is recorded by numerals, bar codes, and marks, all the information may be recorded by any one kind selected from among the numerals, bar codes, and marks, or optical marks displayed by a light-emitting diode or the like may be used. Furthermore, the position where information is recorded on the film is not restricted to the one shown in FIG. 13. For instance, by omitting perforations on one side of the film and by providing an information recording portion on that side at positions corresponding to each interval between adjacent ones of film image frames, recording may be effected on the information recording portion.

The first sensor 14 for optically reading the information 234 indicative of the presence of use of an electronic flash and the LV information 35 as well as the second sensor 16 for optically reading the photographing-time information 36 are disposed upstream of the negative carrier 12 at positions capable of reading the information recorded on the film. The first sensor 14, the second sensor 16, and the two-dimensional image sensor 30 are connected to a control circuit 28 composed of a microcomputer. The keyboard 32 for inputting data and the like is connected to the control circuit 28. The control circuit 28 is connected so as to control the light-adjusting filter 60.

A description will now be given of a routine for printing control by the microcomputer.

FIG. 14 illustrates a printing processing routine in accordance with the embodiment of the third aspect. In Step 300, the information detected by the first sensor 14, the second sensor, and the two-dimensional image sensor 30 is read. In Step 302, on the basis of the information 234 indicative of the presence of use of the electronic flash, a determination is made as to whether or not the electronic flash was used. If YES is the answer, the operation proceeds to Step 306, and if NO is the answer, in Step 304 the color temperature of the subject illuminant is estimated, i.e., the light quality is estimated, and then the operation proceeds to Step 306. It should be noted that since a detailed routine for estimating the color temperature is the same as that described in the embodiment in accordance with the first aspect of the invention, a detailed description thereof will be omitted. In Step 306, the color correction value Cj, the constant Kj, and the like are calculated in correspondence with the light quality estimated. In Step 308, the exposure control value Ej is calculated on the basis of, for instance, Formula (11) given below. Then, in Step 310, printing is effected by controlling the light-adjusting filter 60 on the basis of the exposure control value Ej.

$$logEj = Sj\{Cj(dj - dwj) + dwj\} + Kj \quad (11)$$

where $$dj = Dj - NDj \quad (12)$$

$$dwj = \left(\sum_{j=1}^{3} Dj\right)/3 \quad (13)$$

where j: integer selected from 1-3, representing any one of R, G, and B

Dj: image density (e.g., an average density of the entire image plane) of an individual film image frame.

NDj: average image density (e.g., an average image plane density) of a standard negative film or a multiplicity of film frames Sj: slope control value Cj: color correction value Kj: constant dependent on the printer, film, and photographic paper characteristics Ej: exposure control value corresponding to printing light quantity In addition, the color correction value Cj, constant Kj, slope control value Sj, and the like corresponding to the light quality and calculated in Step 306 are changed as follows.

Electronic flash light (1) To compensate for a change in reciprocity law failure characteristics, the slope control value Sj is changed.

(2) To correct the sensitivity balance due to a change in the color temperature, the color correction value Cj and the constant Kj are changed.

(3) To correct the difference in the scene, the average image density NDj is changed.

Low-color-temperature light, fluorescent lamp light (1) To correct the sensitivity balance due to a change in the color temperature, the color correction value Cj and the constant Kj are changed.

(2) To correct the difference in the scene, the average image density NDj is changed.

In addition, the color correction value Cj of the image density in which the hues change due to the change in the color temperature of the subject illuminant is set on the basis of the color temperature estimated. This color correction value Cj is set in such a manner that if the estimated color temperature is not more than a predetermined value, i.e., the subject has been illuminated with low-color-temperature light (e.g. the setting sun, tungsten light, etc.), then the correction through the color correction value Cj becomes weak or no correction is carried out. That is, a setting is provided such that printing is effected by a low correction. For instance, if it is assumed that the color correction value Cj≈0.5, the correction of color failure is executed, but the light-source-color correction fails to be effected, so that the color of tungsten light is reproduced as a strongly YR-ish color. In the case of a weak high correction, on the other hand, if the color correction value Cj=1.3, for instance, the color failure correction fails to be effected and only the light-source-color correction is effected, so that if the subject illuminant is a tungsten lamp, the color of tungsten light remains. As described above, by effecting the correction through a color correction value at a weak level or by conducting no correction by the color correction value at all, it is possible to have the hues of the subject illuminant reflected on the prints, and produce prints in correspondence with the picture-taking intent. A setting is provided such that a high correction is effected when the estimated color temperature is high-color-temperature light (e.g. a cloudy sky, the shade, etc.). For instance, if the color correction value Cj is set to 2.0, only the light-source correction is carried out in the same way as described above, and the tungsten lamp light is printed into a daylight color.

At this juncture, the color correction value Cj of the image density (image density outside the shadowed portion in FIG. 2) in which hues do not change by the color temperature of the subject illuminant is set at the same value as that of Step 304.

Since the degree of contribution, to exposure control values, of image densities including the hues of the subject illuminant at a time when the color correction value Cj is varied is shown in FIG. 5 and is the same as that given in the description of the embodiment in accordance with the first aspect of the invention, a description thereof will be omitted.

As described above, at least one condition selected from among the average image density NDj, the slope control value Sj, and the color correction value Cj is determined in advance in correspondence with the quality of the subject illuminant light, i.e., the photographing light, and the print exposure amount is calculated by selecting the condition(s) in correspondence with the light quality.

It should be noted that since the first to fourth methods of estimating the color temperature are the same as those described for the embodiment in accordance with the first aspect of the invention, a description thereof will be omitted.

Figure 15:
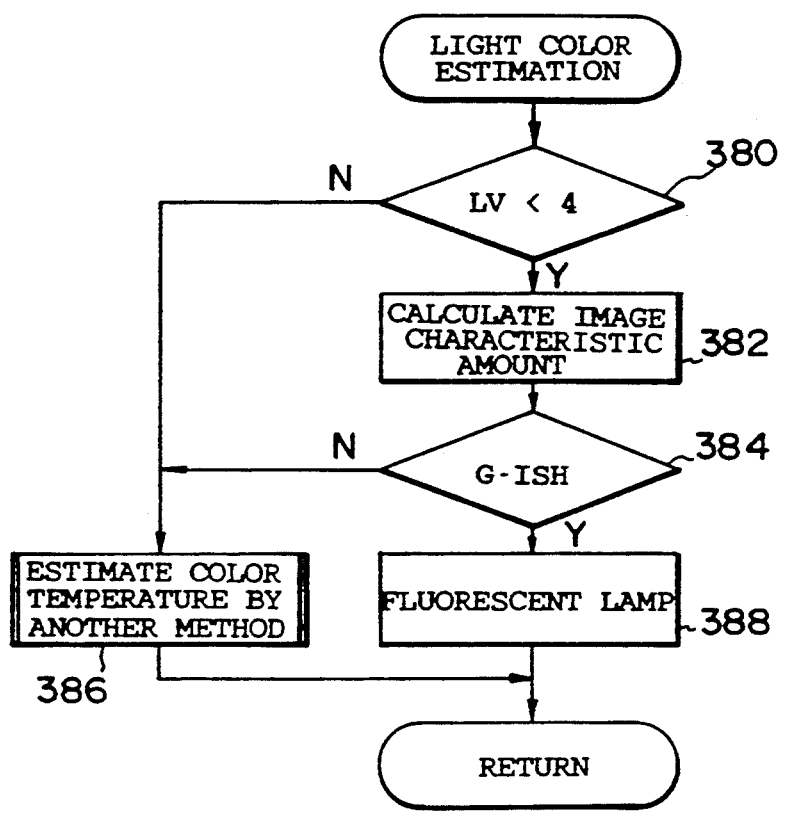
FIG. 15 is a flowchart illustrating a routine of a fifth method for estimating the color temperature.

Referring now to FIG. 15, a description will be given of a fifth method of estimating the color temperature (light quality). In Step 380, a determination is made as to whether or not the LV is is less than a predetermined value (e.g. 4), and if YES is the answer, an image characteristic amount, e.g. the G density, is calculated in Step 382. In Step 384, a determination is made on the basis of the G density as to whether or not the color is G-ish. If YES is the answer, a determination is made that the subject illuminant is a fluorescent lamp, and the result is stored in the RAM. Meanwhile, if the LV is the predetermined value or more, and the light is not G-ish, in Step 386 the color temperature is estimated in accordance with any of the other methods described above.

In the same way as the embodiment in accordance with the first aspect of the invention, by combining the above-described second and fourth methods, or by combining the second, third, and fourth methods, it is possible to estimate with high accuracy whether or not the subject illuminant employed is a tungsten lamp or fluorescent lamp.

In addition, the magnetic tape 500 may be attached to the film, as shown in FIG. 19, or a transparent magnetic paint may be applied to an adjacent surface of the transparent base 550 of the film F so as to provide the magnetic recording layer 554, as shown in FIG. 20, and the information may be stored in these magnetic material portions. Furthermore, as shown in FIG. 21, it is possible to form on the magnetic recording layer 554 a plurality of tracks (C0−C3) for recording by a recording head (not shown) in such a manner as to be formed continuously in the longitudinal direction of the negative film F outside the image frames thereof.

It should be noted that although in the above a description has been given of an example in which the information indicative of the presence of use of an electronic flash, photographing-time information, and so on are recorded on a film. A arrangement may be alternatively provided such that the information is stored in a magnetic recording portion connected to the film or in a storage means attached to the film, such as a magnetic card, an IC card, an IC, or the like.

Referring now to FIG. 16, a detailed description will be given of an embodiment in accordance with a fourth aspect of the present invention. In FIG. 16, components or portions that are identical with or equivalent to those of the above-described embodiment in accordance with the first aspect of the invention are denoted by the same reference numerals, and a description thereof will be omitted. In the embodiment of the fourth aspect, the present invention is applied to the color photographic printer shown in FIGS. 3.

As shown in FIG. 16, perforations provided in one side the negative film 20 are omitted, and the information 234 indicative of the use of an electronic flash and the information 35 indicative of an LV have been recorded at the position where the perforations were present. In addition, the photographing-time information 36 indicative of the date and time of picture taking and photographing. district information information 37 indicative of the district where the photograph was taken have been printed thereon. The information 234 indicative of the presence of use of the electronic flash is recorded by a mark or the like at the time when the electronic flash was used, while the LV at the time of photographing is recorded by a bar code as the information 35 indicative of the LV. Incidentally, if the electronic flash was not used, nothing is recorded at the position where the information indicative of the use of the electronic flash is to be recorded. As the photographing-time information 36, the date (year may or may not be added) and time of picture taking are used, and this photographing-time information is printed at the time of photographing by making use of the date- and time-add-on mechanism of the camera. In addition, the following are used as the photographing-district information 37: a district cord S or N for discriminating whether the district where the photograph was taken in the southern hemisphere or northern hemisphere, and latitude codes H, M, and L for discriminating high, middle, and low latitudes. It should be noted that only the code S or N may be used as the photographing-district information, or country codes or codes of districts within a country may be used independently. This photographing-district information is printed on the film at the time of photographing, and it is desirable to effect printing automatically by providing the camera with a changeover switch in advance and by changing over the switch in correspondence with the photographing district and latitude.

Although in FIG. 16 the information is recorded by the alphabet, numerals, bar codes, and marks, all the information may be recorded by any one kind selected from among the alphabet, numerals, bar codes, and marks, or optical marks displayed by a light-emitting diode or the like may be used. Furthermore, the position where the information is recorded on the film is not restricted to the one shown in FIG. 16, and it is possible to employ conventional film provided with perforations.

The first sensor 14 for optically reading the information 234 indicative of the presence of use of an electronic flash and the LV information 35 as well as the second sensor 16 for optically reading the photographing-time information 36 and the photographing-district information 37 are disposed upstream of the negative carrier 12 at positions capable of reading the information recorded on the film. The first sensor 14, the second sensor 16, and the two-dimensional image sensor 30 are connected to a control circuit 28 composed of a microcomputer. The keyboard 32 for inputting data and the like is connected to the control circuit 28. The control circuit 28 is connected so as to control the light-adjusting filter 60.

Since the routine for printing control by the microcomputer is the same as the one described for the third aspect of the invention, a description thereof will be omitted.

Since the degree of contribution, to exposure control values, of image densities including the hues of the subject illuminant at a time when the color correction value Cj is varied is shown in FIG. 5 and is the same as that given in the description of the embodiment in accordance with the first aspect of the invention, a description thereof will be omitted.

As described above, at least one condition selected from among the average image density NDj, slope control value Sj, and color correction value Cj is determined in advance in correspondence with the quality of the subject illuminant light, i.e., the photographing light, and print exposure amount is calculated by selecting the condition(s) in correspondence with the light quality.

It should be noted that since the first to fifth methods of estimating the color temperature are the same as those described for the embodiment in accordance with the first and fourth aspects of the invention, a description thereof will be omitted.

A description will now be given of a sixth method of estimating the color temperature. In this method, the photographing-time information and the photographing district information are used. In cases where this method is utilized, an average sunrise time $SQ_N$, an average sunset time $SI_N$, a time duration $X_N$ until the sun rises high for each date on the northern hemisphere, as well as an average sunrise time $SQ_S$, an average sunset time $SI_S$, a time duration $X_S$ until the sun rises high for each date on the southern hemisphere are stored in advance in the printer by way of respective initial values. The time duration $X_N$ for the northern hemisphere is set to, for instance, 1 in the case of summer season (June-August), 3 in the case of winter season (December-February), 1 in a case where the district determined from the latitude information is a southern district (low latitudes), 2 in the case of a middle district (intermediate latitudes), and 3 in the case of a northern district (high latitudes). Meanwhile, in the case of the southern hemisphere, the time duration $X_N$ is set to 1 in the case of summer season (December-February), 3 in the case of winter season (June-August), 1 in a case where the district is a southern district (high latitudes), 2 in the case of a middle district (intermediate latitudes), and 3 in the case of a northern district (low latitudes).

Figure 17:
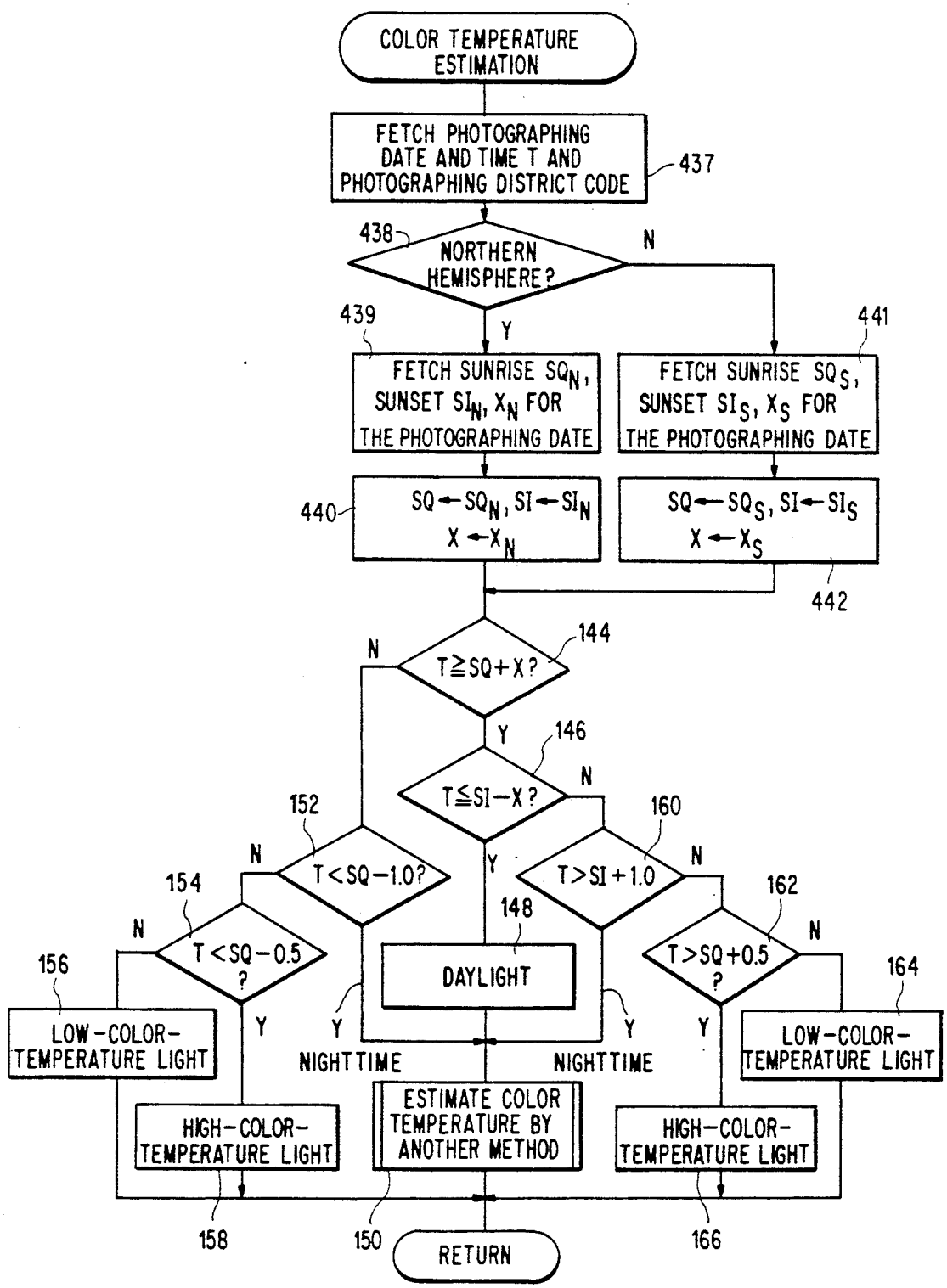
FIG. 17 is a flowchart illustrating a routine of a sixth method for estimating the color temperature.

Referring now to FIG. 17, a description will be given of a routine for estimating the color temperature. In Step 437, the photographing date, photographing time T, district code, and latitude code are fetched by fetching the photographing-time information 36 and the photographing-district information 37. In Step 438, a determination is made as to whether or not the district code indicates the northern hemisphere. In the case of the northern hemisphere, the average sunrise time $SQ_N$ and the average sunset time $SI_N$, both corresponding to the photographing date, as well as the time duration $X_N$ corresponding to the latitude code are fetched in Step 439. Then, in Step in 440, the average sunrise time $SQ_N$, the average sunset time $SI_N$, and the time duration $X_N$ are replaced with the average sunrise time SQ, the average sunset time SI, and the time duration X. On the other hand, if it is judged that the district code indicates the southern hemisphere, the average sunrise time $SQ_S$ and the average sunset time $SI_S$, both corresponding to the photographing date, as well as the time duration $X_S$ corresponding to the latitude code are fetched in Step 441. Then, in Step in 442, they are replaced with SQ, SI, and X. Step 144 and ensuing steps are common with those of the third method of estimating the color temperature in accordance with the first aspect of the invention, but they will be described below. In Step 144, a comparison is made between the photographing time T and the time after the lapse of the time duration X from sunrise, i.e., SQ+X. In Step 146, a comparison is made between the photographing time T and the time the X time duration before sunset, i.e., SI−X. If $SQ+X \leq T-SI-X$, it is determined that the subject illuminant light is daylight, and the fact that it is daylight is stored in the RAM in Step 148. In Step 150, the color temperature is estimated by using[1] the above-described method of color temperature estimation, or the like.

If $T<SQ+X$, comparisons are made in Steps 152 and 154 between the photographing time and the time an hour before sunrise, SQ−1.0, and between the photographing time and the time a 0.5 hour before sunrise, SQ−0.5, respectively. If $T<SQ-1.0$, it is determined that the time is nighttime, and the operation proceeds to Step 150. In addition, if $SQ-1.0 \leq T < SQ-0.5$, since the time is between 30 minutes to one hour before sunrise, it is determined in Step 158 that the color temperature is high, i.e., the subject illuminant light is high-color-temperature light. Meanwhile, if $SQ+X > T \geq SQ-0.5$, since the time is between 30 minutes before sunrise and the time when the sun rises high, it is determined in Step 156 that the color temperature is low, i.e., the subject illuminant light is low-color-temperature light.

If $T>SI-X$, comparisons are made in Steps 160 and 162 between the photographing time and the time a 0.5 hour after sunset, SI+0.5, and between the photographing time and the time an hour after sunset, SI+1, respectively. Then, if the photographing time T has elapsed one hour after sunset, it is determined that the time is nighttime, and the operation proceeds to Step 150. Meanwhile, if the time is between the 0.5 hour to one hour after sunset, it is determined that the color temperature is high (high-color-temperature light), and the operation proceeds to Step 166. If $SI-X<T \leq SI+0.5$, it is determined that the color temperature is low (low-color-temperature light), and the operation proceeds to Step 164. In the respective cases, each color temperature is stored in the RAM.

Although, in the above description, the information indicating whether the district concerned is the southern or northern hemisphere and the latitude information are used as the information indicative of the photographing district, it is possible to use only the information indicating whether the district concerned is the southern or northern hemisphere, or the country name code and the latitude information may be used. In addition, in cases where the camera is used only in a specific country, the district codes of that country may be used. In other words, it suffices if the information indicating in which district on the earth the camera was used is recorded on the film.

In the same way as the embodiment in accordance with the first aspect of the invention, by combining the above-described second and fourth methods, by combining the second, third, and fourth methods, or by combining the first, second, third, and fourth methods, it is possible to estimate with high accuracy whether or not the subject illuminant employed is a tungsten lamp or fluorescent lamp, or other color temperature was used.

It should be noted that although in the above a description has been given of an example in which the information indicative of the presence of use of an electronic flash, photographing-time information, and so on are recorded on a film, an arrangement may be alternatively provided such that the information is stored in a magnetic recording portion connected to the film or in a storage means attached to the film, such as a magnetic card, an IC card, an IC, or the like.

In addition, the magnetic tape 500 may be attached to the film, as shown in FIG. 19, or a transparent magnetic paint may be applied to an adjacent surface of the transparent base 550 of the film F so as to provide the magnetic recording layer 554, as shown in FIG. 20, and the information may be stored in these magnetic material portions. Furthermore, as shown in FIG. 21, it is possible to form on the magnetic recording layer 554 the plurality of tracks (C0—C3) for recording by a recording head (not shown) in such a manner as to be formed continuously in the longitudinal direction of the negative film F outside the image frames thereof.

Figure 18:
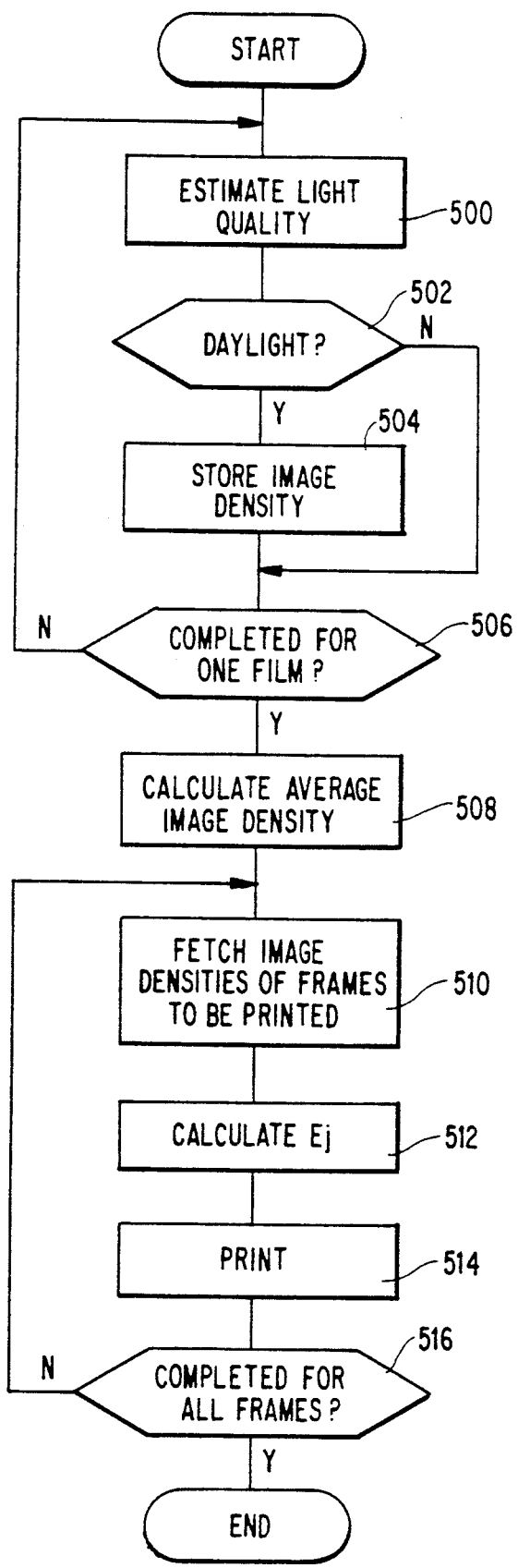
FIG. 18 is a flowchart illustrating a printing processing routine of an embodiment in accordance with a fifth aspect of the invention.

Referring now to FIG. 18, a detailed description will be given of a first embodiment in accordance with a fifth aspect of the present invention. In FIG. 18, components or portions that are identical with or equivalent to those of the above-described embodiment in accordance with the first aspect of the invention are denoted by the same reference numerals, and a description thereof will be omitted. In this embodiment as well, the present invention is applied to the color photographic printer shown in FIGS. 3.

As shown in FIG. 4, light-source-color information 34 has been recorded on the negative film 20, and photographing-time information 36 indicative of the time when the picture was taken has been printed thereon. The light-source-color information 34 can be recorded at a position outside an image frame corresponding to the image plane on which the subject was photographed, by imparting to that position an exposure of the same amount as the subject exposure amount or at a fixed rate. This light-source-color information 34 is used in the estimation of the color temperature of a subject illuminant which will be described later. Instead of this light-source-color information, 34 information indicative of a light quantity value at the time of photographing, i.e., a light value (LV) (exposure value (EV)), may be recorded by means of numerals, codes, bar codes, or the like. As the photographing time information 36, the date (year may or may not be added) and time of picture taking are used, and this photographing-time information is printed at the time of photographing by making use of the date- and time-add on mechanism of the camera.

In FIG. 4, the photographing-time information is shown by numerals, but may be recorded by means of bar codes, or optical marks displayed by a light-emitting diode or the like may be used. Furthermore, the position where information is recorded on the film is not restricted to the one shown in FIG. 4. For instance, by omitting perforations on one side of the film and by providing an information recording portion on that side at positions corresponding to each interval between adjacent ones of film image frames, recording may be effected on the information recording portion.

It should be noted that although in the above a description has been given of an example in which the information indicative of the presence of use of an electronic flash, photographing-time information, and so on are recorded on a film, an arrangement may be alternatively provided such that the information is stored in a magnetic recording portion connected to the film or in a storage means attached to the film, such as a magnetic card, an IC card, an IC, or the like.

In addition, the magnetic tape 500 may be attached to the film, as shown in FIG. 19, or a transparent magnetic paint may be applied to an adjacent surface of the transparent base 550 of the film F so as to provide the magnetic recording layer 554, as shown in FIG. 20, and the information may be stored in these magnetic material portions. Furthermore, as shown in FIG. 21, it is possible to form on the magnetic recording layer 554 the plurality of tracks (C0—C3) for recording by an unillustrated recording head in such a manner as to be formed continuously in the longitudinal direction of the negative film F outside the image frames thereof.

The first sensor 14 for optically reading the light-source-color information 34 and the second sensor 16 for optically reading the photographing time information 36 are disposed upstream of the negative carrier 12 at positions capable of reading the information recorded on the film. The first sensor 14, the second sensor 16, and the two-dimensional image sensor 30 are connected to a control circuit 28 composed of a microcomputer. The keyboard 32 for inputting data and the like is connected to the control circuit 28. The control circuit 28 is connected so as to control the light-adjusting filter 60.

A description will now be given of a routine for printing control by the microcomputer.

FIG. 18 shows a main routine in accordance with this embodiment. In Step 500, the light quality of the subject illuminant is estimated. The details of this light-quality estimation routine will be described later. In an ensuing Step 502, a determination is made as to whether or not the light quality estimated is daylight, and if it is daylight, in Step 504, the image density dij of the frame in which the subject illuminant is daylight is stored in the RAM. In Step 506, a determination is made as to whether or not the estimation of the light quality of frames has been completed for one roll of film. If the estimation of light quality has not been completed for one roll of film, the aforementioned Steps are repeated, and when it is determined that the estimation of light quality has been completed for one roll of film, in Step 508, the average density ADj is calculated on the basis of image densities dij of a plurality of frames stored in the RAM, in accordance with the following Formula (14):

$$ADj = \left( \sum_{j=1}^{n} dij \right) / n \tag{14}$$

where n is the number of frames for which the subject illuminant employed is determined to be daylight through the light quality estimation.

In an ensuing Step 510, the image densities Dj of image frames to be printed are fetched, and in Step 512 the exposure control value Ej is calculated on the basis of the aforementioned Formula (14). It should be noted that, in this case, it is preferable to change the printing conditions between daylight and the light other than the daylight. Furthermore, in cases where the light quality of the subject illuminant is to be reflected on the prints, the color correction value Cj of the image density in which the hues change due to the change in the color temperature of the subject illuminant is set on the basis of the light quality, i.e., color temperature, thus estimated. This color correction value Cj is set in such a manner that if the color temperature estimated is not more than a predetermined value, i.e., the subject has been illuminated with low-color-temperature light (e.g. the setting sun, tungsten light, etc.), then the correction through the color correction value Cj becomes weak or no correction is carried out. That is, a setting is provided such that printing is effected by lowered correction. For instance, if it is assumed that the color correction value Cj≈0.5, the correction of color failure is executed, but the light-source-color correction fails to be effected, so that the of tungsten light is reproduced as a strongly YR-ish color. In the case of a weak high correction, on the other hand, if the color correction value Cj=1.3, for instance, the color failure correction fails to be effected and only the light-source-color correction is effected, so that if the subject illuminant is a tungsten lamp, the color of tungsten light remains. As described above, by effecting the correction through a color correction value at a weak level or by conducting no correction by the color correction value at all, it is possible to have the hues of the subject illuminant reflected on the prints, and produce prints in correspondence with the picture-taking intent. A setting is provided such that a higher correction is effected when the estimated color temperature is high-color-temperature light (e.g. a cloudy sky, the shade, etc.). For instance, if the color correction value Cj is set to 2.0, only the light-source correction is carried out in the same way as described above, and the tungsten lamp light is printed into a daylight color.

At this juncture, the color correction value Cj of the image density (image density outside the shadowed portion in FIG. 2) in which hues do not change by the color temperature of the subject illuminant is set at the same value as that of Step 512.

Since the degree of contribution, to exposure control values, of image densities including the hues of the subject illuminant at a time when the color correction value Cj is varied is shown in FIG. 5 and is the same as that given in the description of the embodiment in accordance with the first aspect of the invention, a description thereof will be omitted.

Then in Step 514, printing is carried out by controlling the light-adjusting filter. In step 516, a determination is made as to whether the printing of all the frames has been completed, and if YES is the answer, this routine ends. If the printing of all the frames has not been completed, the operation returns to Step 5110 to continue printing.

As described above, in accordance with this embodiment, since the image densities of the light other than daylight are not used in calculating the average image density used for calculating the exposure control value, the average image density is prevented from deviating from a standard value, thereby making it possible to obtain prints of good color reproducibility. It should be noted that in this embodiment the image densities are photometrically measured in Steps 504 and 510. In this case, printing is effected while the film is being returned after being photometrically measured in the direction of arrow a in FIG. 3, or while the film is returned once and is being sent again in the direction of arrow a. Also, it is possible to adopt an alternative method in which Step 510 is omitted, and the photometric values measured in Step 504 are stored in the RAM, whereupon the photometric values are read in Step 510 to calculate the exposure amount Ej. In addition, the present invention can be effectively applied to an automatic color printer in which, unlike the arrangement shown in FIG. 3, the photometric section and the exposure section are separated. In this case, the image densities of one roll of film may not necessarily be stored.

A description will now be given of a second embodiment in accordance with the fifth aspect of the invention. In this embodiment, average image densities are determined separately for different types of light quality. Since the control routine of this embodiment is substantially identical with the routine shown in FIG. 18, an illustration thereof will be omitted, and a description will be given by referring to the routine shown in FIG. 18. After the light quality is estimated in Step 500, a determination is made in Step 502 as to whether the subject illuminant is daylight or an electronic flash. In Step 504, image densities are stored in areas provided separately for the daylight and electronic flash. Subsequently, in Step 508, average image densities are calculated separately for the daylight and electronic flash. In calculating an exposure control value in Step 512, a determination is made as to whether the subject illuminant of the frame to be printed is the daylight or electronic flash, and the exposure control value is calculated using the aforementioned average image densities for the respective types of light quality.

In this case, it is preferable to determine in advance the slope control value Sj, color correction value Cj, and constant Kj dependent on the printer, film, and photographic paper characteristics in the aforementioned Formula (2) for each type of light quality. A setting for daylight may be provided such that a lowest correction (lowered correction) may be carried out for the period between 10:00 a.m. and p.m. 2:00, and high correction may be carried out when the photographing time fell outside that range of time. The following are examples of the color correction value Cj:

| 10:00 a.m.–p.m. 2:00 | Cj = 80 |
| 8:00 a.m.–10:00 and p.m. 2:00–5:00 | Cj = 100 |
| 7:00 a.m.–8:00 and p.m. 5:00–6:00 | Cj = 120 |
| Before 7:00 a.m. and after p.m. 6:00 | Cj = 140 |

Although in the first embodiment an arrangement is provided such that the image densities of frames photographed under light other than daylight are not used in calculating an average image density, the image densities may be used in calculating the average image density by being corrected in correspondence with their light quality. In addition, although in the above example the average image density is calculated from the image densities of one roll of film, the average image density may be calculated from the image densities of films of the same type or from the image densities of films on which similar images have been recorded.

Furthermore, the exposure control value is determined by Formula (2) above, but may be determined in accordance with the following Formulae (15) and (16):

$$\log Ej = Sj\{\alpha \cdot Dj + (1 - \alpha)ADj - NDj\} + Kj \quad (15)$$

where $\alpha$ is a weight coefficient, and NDj is a reference value determined from a standard negative film.

$$\log Ej = \beta \cdot DAj + (1-\beta)D'j \quad (16)$$

where $$D'j = \left(\sum_{j=1}^{n} dij\right)/n + kj \quad (17)$$

and kj is a correction coefficient for ensuing that the average value of a multiplicity of frames becomes gray; DAj is an average value of photometric values within a predetermined range centering on gray on color coordinates; an and $\beta$ is a weight coefficient. It should be noted that since the first to fourth those described for the embodiment in accordance with the first aspect of the invention, a description thereof will be omitted.

In the same way as the embodiment in accordance with the first aspect of the invention, by combining the above described second and fourth methods, or by combining the second, third, and fourth methods, it is possible to estimate with high accuracy whether or not the subject illuminant employed is a tungsten lamp or fluorescent lamp.

Although in the above embodiment a description has been given of an example in which the light-source-color information, photographing-time information, and so on are recorded on a film, an arrangement may be alternatively provided such that the information is stored in a magnetic recording portion connected to the film or in a storage means attached to the film, such as a magnetic card, an IC card, an IC, or the like.

In addition, the magnetic tape 500 may be attached to the film, as shown in FIG. 19, or a transparent magnetic paint may be applied to an adjacent surface of the transparent base 550 of the film F so as to provide the magnetic recording layer 554, as shown in FIG. 20, and the information may be stored in these magnetic material portions. Furthermore, as shown in FIG. 21, it is possible to form on the magnetic recording layer 554 the plurality of tracks (C0—C3) for recording by an unillustrated recording head in such a manner as to be formed continuously in the longitudinal direction of the negative film F outside the image frames thereof.

What is claimed is:

1. A photographic printing method for printing a film image of frames of a film onto photographic paper by correcting a print exposure amount determined on the basis of an image density of the film image, comprising the steps of:
    estimating color quantity of a subject illuminant for each of the frames based on information recorded at the time of photographing;
    changing, in correspondence with the color quantity estimated, a degree of color correction of the image density for each of the frames in which an improper color balance occurs in color reproduction with a change in the color quantity of the subject illuminant; and
    determining the print exposure amount to control the color of a print in correspondence with both a density difference between the image density of the film image to be printed and an average image density and the degree of color correction.

2. A photographic printing method according to claim 1, wherein if the color quality estimated is not more than a predetermined value, either the degree of correction is set to a low level or no correction is effected.

3. A photographic printing method according to claim 1, wherein if the color quality estimated exceeds a predetermined value, the degree of correction is strengthened.

4. A photographic printing method according to claim 1, wherein the estimation of the color quality is effected by at least one, or a combination of two or more, of the following steps (a) to (c):
    (a)) determining whether or not the subject illuminant is a fluorescent lamp by determining whether a difference between an exposure amount density caused by the subject illuminant light and an average image density of the film is in linear or curvilinear relationship with the image density of the film; and, if said difference is in said linear relationship, determining the gradient of a straight line thereof thereby to determine whether the subject illuminant light is high-color-temperature light, standard light, or low-color-temperature;
    (b) determining a state of sunlight at the point of time of photographing by storing in advance on the film information on the date and time of photographing with the film, and by comparing said information with data including the time of sunrise, time of sunset, and the time until the sun rises high with respect to each said preset date of photographing; and
    (c) recording in advance an exposure amount value at the time of photographing with the film, and determining whether the exposure amount value is not less than a predetermined value.

5. A photographic printing method according to claim 1, wherein at least a portion of the film includes the information recorded at the time of photographing.

6. A photographic printing method according to claim 1, wherein the color quality is a color temperature, and
    wherein said controlling step controls the color of the print based on a value obtained by multiplying the color correction value by the density difference.

7. A photographic printing method according to claim 1, wherein the information comprises at least one of photographing-time information and light-source-color information.

8. A photographic printing method according to claim 7, wherein at least a portion of the film includes the information recorded at the time of photographing.

9. A photographic printing method for printing an image on film onto photographic paper by correcting a print exposure amount determined on the basis of an image density of the film image, comprising the steps of:
    determining a photographer's picture-taking intent in expressing the hues of an original scene based on information recorded at the time of photographing;
    changing, in correspondence with the picture-taking intent, a degree of color correction of the image density in which an improper color balance occurs in color reproduction with a change in the color quality of the subject illuminant; and
    determining the print exposure amount to control the color of a print in correspondence with both a density difference between the image density of the film image to be printed and an average image density and the degree of color correction.

10. A photographic printing method according to claim 9, wherein light-source-color information is recorded on the film at the time of photographing, as necessary, and the color quality of the subject illuminant is estimated on the basis of the light-source-color information recorded at the time of photographing.

11. A photographic printing method according to claim 10, wherein the estimation of the color quality is effected by at least one, or a combination of two or more, of the following steps (a) to (d):
(a) determining whether or not the subject illuminant is a fluorescent lamp by determining whether a difference between an exposure amount density caused by the subject illuminant light and an average image density of the film is in linear or curvilinear relationship with the image density of the film; and, if said difference is in said linear relationship, determining the gradient of a straight line thereof thereby to determine whether the subject illuminant light is high-color-temperature light, standard light, or low-color-temperature light;
(b) presetting on coordinates a region where a color difference of low-color-temperature light is present and a region where a color difference of high-color-temperature light is present in a relationship between a color difference between red and green and a color difference between green and blue in the average image density of the film; and determining to which region the color difference between red and green and the color difference between green and blue in the average image density of the film to be printed belongs;
(c) determining a state of sunlight at the point of time of photographing by storing in advance on the film information on the date and time of photographing with the film, and by comparing said information with data including the time of sunrise, time of sunset, and the time until the sun rises high with respect to each said preset date of photographing; and
(d) recording in advance an exposure amount value at the time of photographing with the film, and determining whether the exposure amount value is not less than a predetermined value.

12. A photographic printing method for printing a film image onto photographic paper, comprising the steps of:
(a) estimating light quality of a subject illuminant on the basis of information recorded at the time of photographing, the information including a date and time of photographing, a light value at the time of photographing, and information indicative of the presence or absence of use of an electronic flash at the time of photographing; and
(b) determining a print exposure amount in correspondence with the light quality estimated.

13. A photographic printing method according to claim 12, wherein an estimation is made from the information indicative of the presence or absence of use of an electronic flash as to whether or not the subject illuminant is an electronic flash; an estimation is made from the information indicative of the date and time of photographing as to whether or not the subject illuminant light is low-color-temperature light when it is estimated that the subject illuminant is not electronic flash; and an estimation is made from the information indicative of light amount at the time of photographing and a characteristic amount of an image density as to whether or not the subject illuminant is a fluorescent lamp when it is estimated that the subject illuminant is not an electronic flash.

14. A photographic printing method according to claim 12, wherein estimation of color temperature in the estimation of the light quality is effected by at least one, or a combination of two or more, of the following steps (a) to (d):
(a) determining whether or not the subject illuminant is a fluorescent lamp by determining whether a difference between an exposure amount density caused by the subject illuminant light and an average image density of the film is in linear or curvilinear relationship with the image density of the film; and, if said difference is in said linear relationship, determining the gradient of a straight line thereof thereby to determine whether the subject illuminant light is high-color-temperature light, standard light, or low-color-temperature light;
(b) presetting on coordinates a region where a color difference of low-color-temperature light is present and a region where a color difference of high-color-temperature light is present in a relationship between a color difference between red and green and a color difference between green and blue in the average image density of the film; and determining to which region the color difference between red and green and the color difference between green and blue in the average image density of the film to be printed belongs;
(c) determining a state of sunlight at the point of time of photographing by storing in advance on the film information on the date and time of photographing with the film, and by comparing said information with data including the time of sunrise, time of sunset, and the time until the sun rises high with respect to each said preset date of photographing; and
(d) recording in advance an exposure amount value at the time of photographing with the film, and determining whether the exposure amount value is not less than a predetermined value.

15. A photographic printing method for printing a film image onto photographic paper, comprising the steps of:
(a) estimating light quality of a subject illuminant on the basis of information recorded at the time of photographing, the information including at least a time and date of photographing and a photographing district; and
(b) determining a print exposure amount in correspondence with the light quality estimated.

16. A photographing printing method according to claim 15, wherein an estimation is made from the information indicative of the presence or absence of use of an electronic flash and the photographing district as to whether or not the subject illuminant is an electronic flash; an estimation is made from the information indicative of the date and time of photographing as to whether or not the subject illuminant light is low-color-temperature light when it is estimated that the subject illuminant is not electronic flash; and an estimation is made from the information indicative of light amount at the time of photographing and a characteristic amount of an image density as to whether or not the subject illumination is a fluorescent lamp when it is estimated that the subject illuminant is not an electronic flash.

17. A photographic printing method according to claim 15, wherein the information indicative of the photographing district comprises information indicative of whether the place of photographing is the northern hemisphere or the southern hemisphere and latitude information indicative of whether the place of photographing is in high, middle, or low altitude.

18. A photographic printing method for printing a film image onto photographic paper, comprising the steps of:
   (a) estimating light quality of subject illuminant based on information recorded at the time of photographing;
   (b) determining an average image density from image densities of a plurality of frames photographed under the subject illuminant having a specific light quality;
   (c) selecting a color correction value in accordance with the light quality estimated;
   (d) determining a print exposure amount by using the average image density as a reference density;
   (e) correcting the print exposure amount in accordance with the color correction value to produce a corrected print exposure amount; and
   (f) printing the film image onto the photographic paper in correspondence with the corrected print exposure amount.

19. A photographic printing method according to claim 13, wherein the print exposure amount is determined separately for each type of light quality estimated.

20. A photographic printing method according to claim 18, wherein estimation of color temperature in the estimation of the light quality is effected by at least one, or a combination of two or more, of the following steps (a) to (d);
   (a) determining whether or not the subject illuminant is a fluorescent lamp by determining whether a difference between an exposure amount density caused by the subject illuminant light and an average image density of the film is in linear or curvilinear relationship with the image density of the film; and, if said difference is in said linear relationship, determining the gradient of a straight line thereof thereby to determine whether the subject illuminant light is high-color-temperature light, standard light, or low-color-temperature light;
   (b) presetting on coordinates a region where a color difference of low-color-temperature light is present and a region where a color difference of high-color-temperature light is present in a relationship between a color difference between red and green and a color difference between green and blue in the average image density of the film; and determining to which region the color difference between red and green and the color difference between green and blue in the average image density of the film to be printed belongs;
   (c) determining a state of sunlight at the point of time of photographing by storing in advance on the film information on the date and time of photographing with the film, and by comparing said information with data including the time of sunrise, time of sunset, and the time until the sun rises high with respect to each said preset date of photographing; and
   (d) recording in advance an exposure amount value at the time of photographing with the film, and determining whether the exposure amount value is not less than a predetermined value.

21. A photographing printing method for printing a film image onto photographic paper, comprising the steps of:
   (a) estimating a light quality of a subject illuminant based on information recorded at the time of photographing;
   (b) determining the average image density separately for each type of the light quality estimated;
   (c) selecting a color correction value in accordance with the light quality estimated;
   (d) determining a print exposure amount by using the average time density as a reference density;
   (e) correcting the print exposure amount in accordance with the color correction value to produce a corrected print exposure amount; and
   (f) printing the film image onto the photographic paper in correspondence with the corrected print exposure amount.

22. A photographic printing method according to claim 21, wherein the print exposure amount is determined for each type of light quality estimated.

23. A photographic printing method according to claim 21, wherein an estimation is made as to whether the subject illuminant is an electronic flash or daylight, the average image density is determined separately for the electronic flash light and the daylight, and the print exposure amount is determined separately for the electronic flash light and the daylight.

* * * * *